United States Patent [19]

Tate et al.

[11] Patent Number: 4,995,347
[45] Date of Patent: Feb. 26, 1991

[54] INTAKE DEVICE OF A TWO STROKE ENGINE WITH SUPERCHARGER BYPASS PASSAGE

[75] Inventors: Takao Tate, Susono; Norihiko Nakamura, Mishima; Hiroshi Noguchi, Gotemba; Michio Kawagoe, Susono; Toyokazu Baika, Susono; Kichiro Kato, Susono; Yoshio Kido, Gotemba; Katsuhiko Hirose, Susono; Hiroaki Nihei, Susono; Masahiko Masubuchi, Susono, all of Japan

[73] Assignee: Toyota Jidosha Kabushiki Kaisha, Aichi, Japan

[21] Appl. No.: 443,314

[22] Filed: Nov. 30, 1989

[30] Foreign Application Priority Data

Dec. 6, 1988 [JP]  Japan ................................ 63-306807
Mar. 8, 1989 [JP]  Japan ..................................... 1-53680

[51] Int. Cl.⁵ ............................................. F02B 75/02
[52] U.S. Cl. ................................ 123/65 BA; 123/559.1
[58] Field of Search ............. 123/65 BA, 559.1, 65 B, 123/65 R

[56] References Cited

U.S. PATENT DOCUMENTS

| 2,935,053 | 5/1960 | Brueder | 123/65 BA |
| 4,702,219 | 10/1987 | Tadokoro et al. | 123/559.1 |
| 4,709,682 | 12/1987 | kato | 123/559.1 |
| 4,907,549 | 3/1990 | Morikawa et al. | 123/65 BA |
| 4,932,368 | 6/1990 | Abe et al. | 123/559.1 |

FOREIGN PATENT DOCUMENTS

| 48-71204 | 9/1973 | Japan . | |
| 0047119 | 3/1983 | Japan | 123/559.1 |
| 61-83460 | 4/1986 | Japan . | |
| 62-57733 | 4/1987 | Japan . | |
| 0075040 | 4/1987 | Japan | 123/559.1 |
| 62-93128 | 6/1987 | Japan . | |
| 62-95135 | 6/1987 | Japan . | |
| 62-95136 | 6/1987 | Japan . | |
| 62-95137 | 6/1987 | Japan . | |
| 63-130631 | 8/1988 | Japan . | |
| 63-130632 | 8/1988 | Japan . | |
| 63-132840 | 8/1988 | Japan . | |
| 63-134133 | 9/1988 | Japan . | |

Primary Examiner—David A. Okonsky
Attorney, Agent, or Firm—Oliff & Berridge

[57] ABSTRACT

A two stroke engine equipped with a mechanically driven supercharger in the intake passage downstream of throttle valve. A bypass air passage bypassing the supercharger is provided, and a bypass air control valve is arranged in the bypass air passage. When the engine is idling, the bypass air control valve is controlled so that the level of vacuum in the intake passage between the throttle valve and the supercharger is maintained at a constant value.

37 Claims, 15 Drawing Sheets

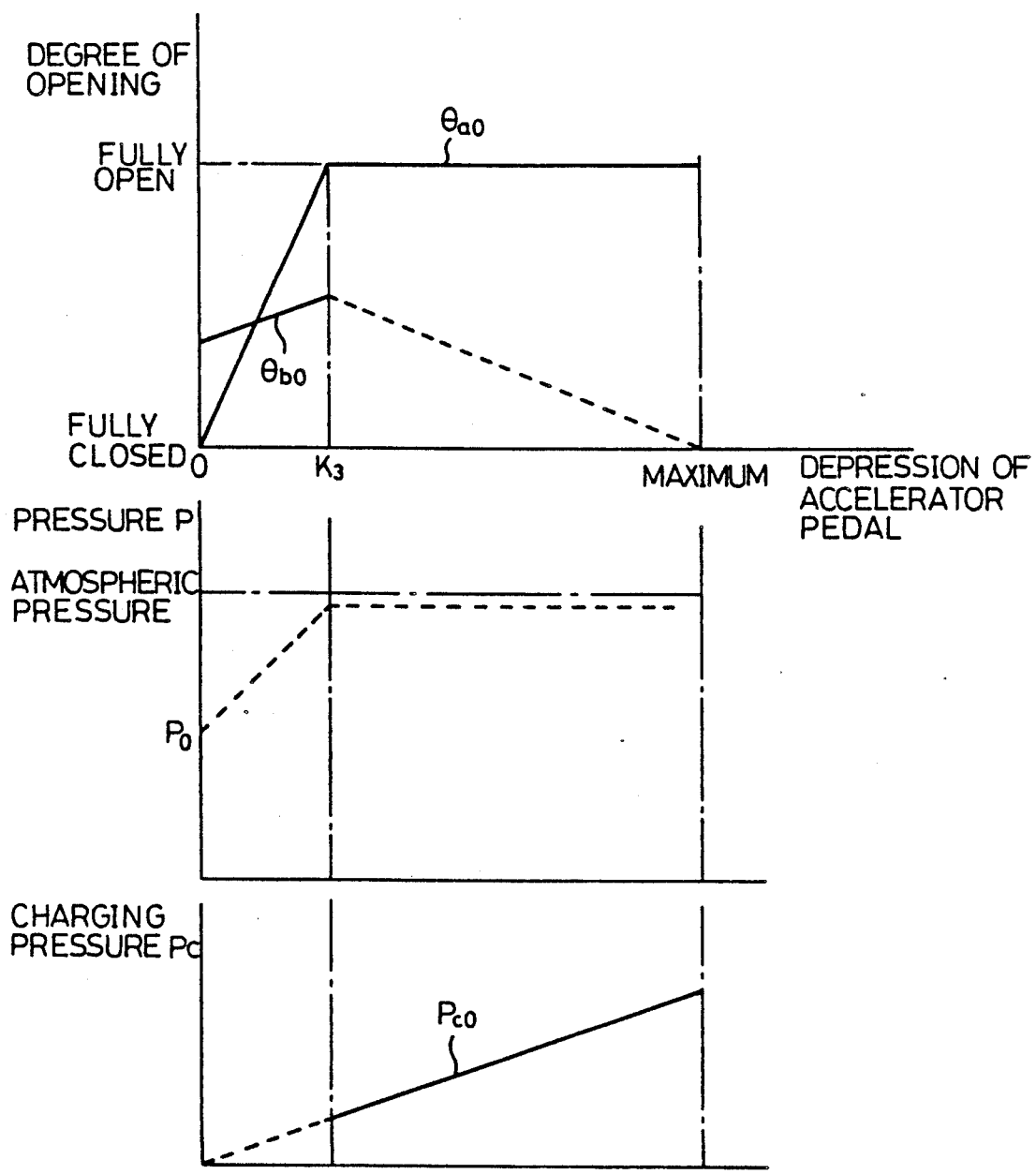

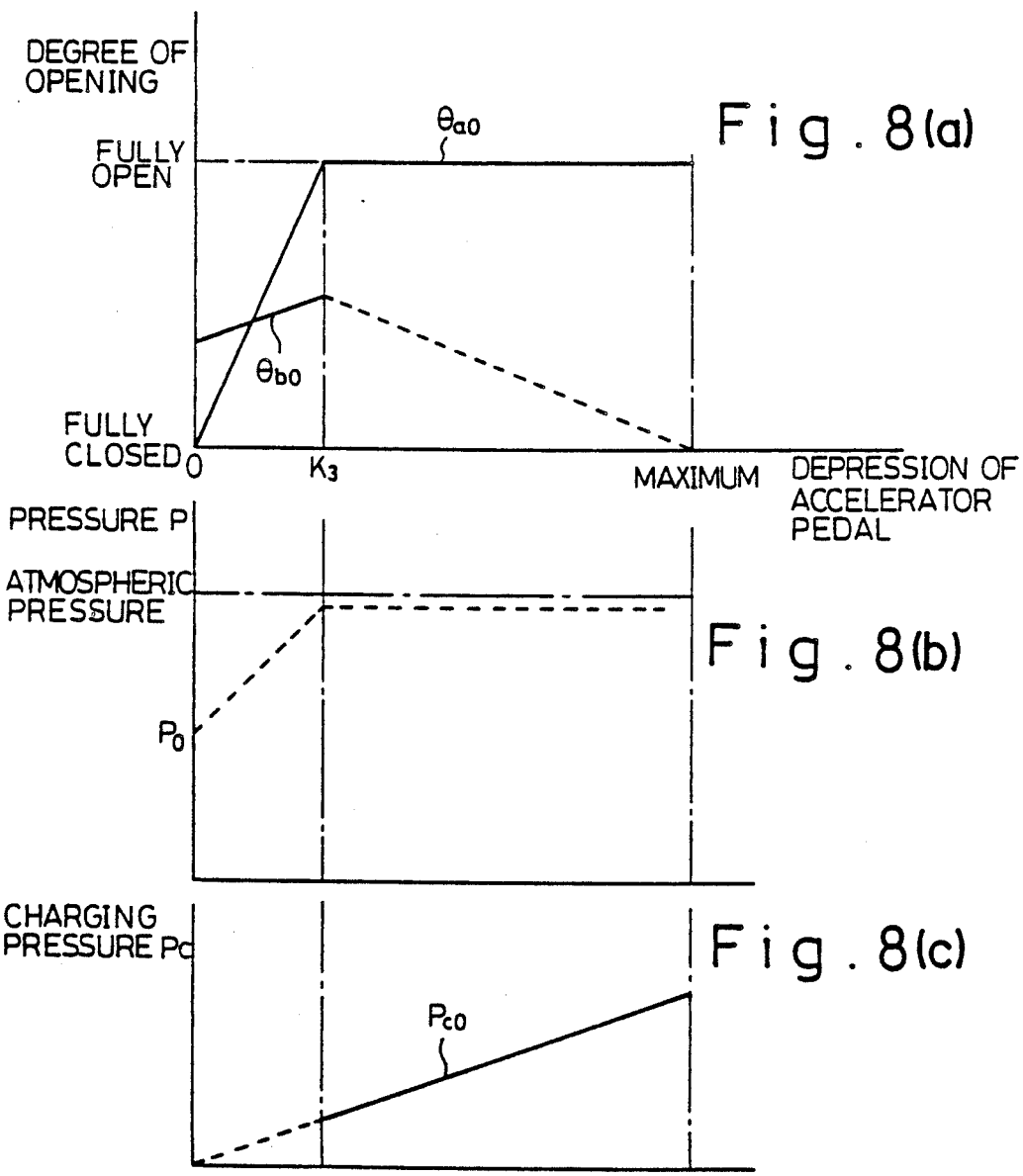

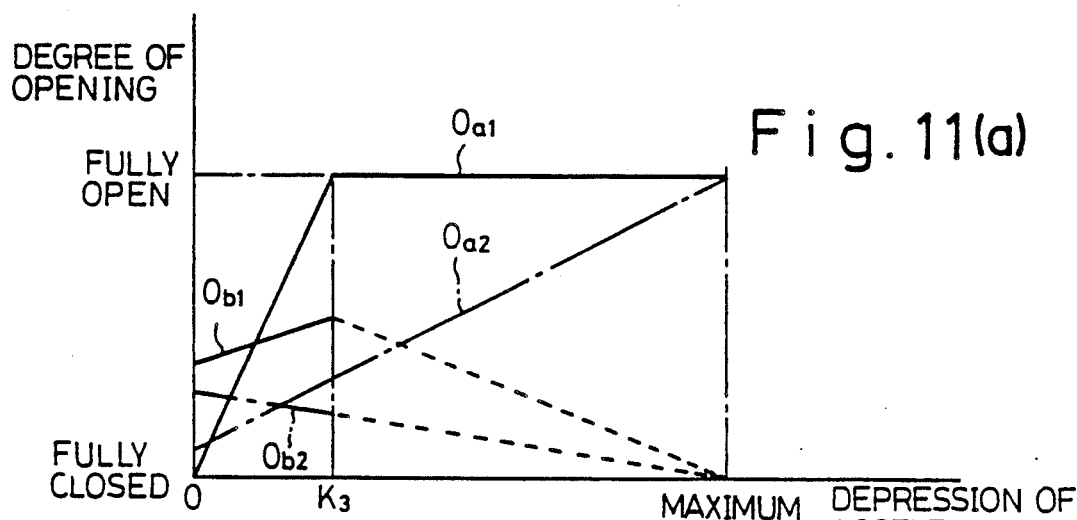
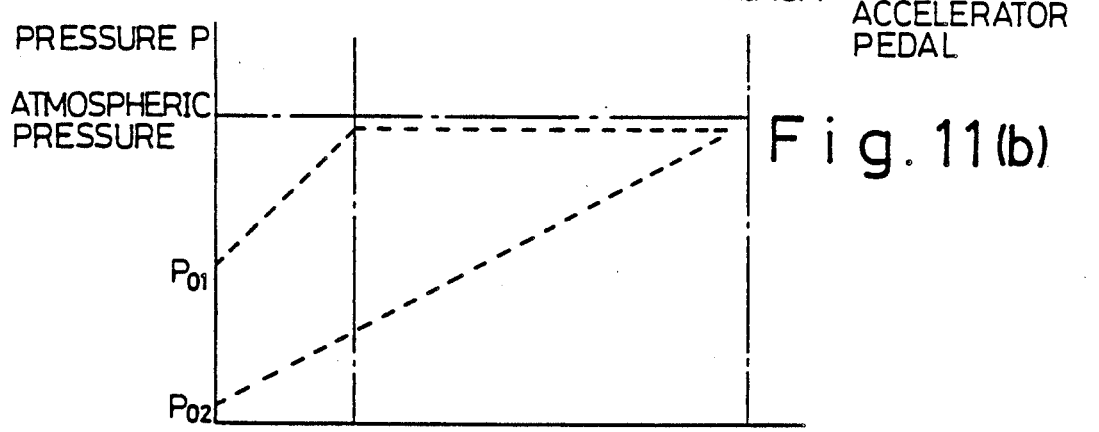
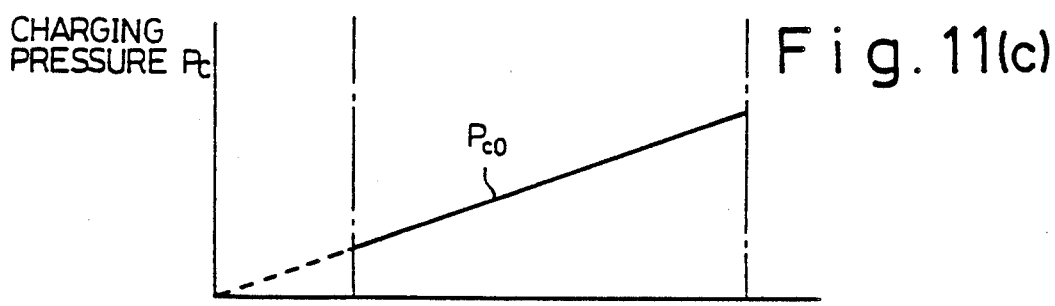

under a light or a middle load, and thus the turbocharger is not operated, the amount of air fed into the engine cylinders is controlled by changing the position of the throttle valve from the idling position to the fully open position. In addition, in this engine, a bypass control valve is arranged in the bypass air passage bypassing the compressor of the turbocharger, and when the engine is operating under a heavy load and thus the turbocharger is operated, the charging pressure of air fed into the engine cylinders is controlled by changing the degree of opening of the bypass value while maintaining the throttle valve at the fully open position (see Japanese Unexamined Patent Publication No. 61-83460). As mentioned above, in a four stroke engine, when the engine is operating under a heavy load, usually a turbocharger is operated to charge air fed into the engine cylinders.

In a two stroke engine equipped with an intake valve, however, the required pressure of air fed into the engine cylinders is different from that in a four stroke engine. Namely, in such a two stroke engine it is necessary to maintain the pressure in the intake part at a positive pressure at all times, to force fresh air into the engine cylinders, and to this end, a mechanically driven supercharger continuously driven by the engine is used. Such a mechanically driven supercharger is usually arranged in the intake passage downstream of the throttle valve, and therefore, during idling wherein the degree of opening of the throttle valve is small, the fresh air of a large vacuum downstream of the throttle valve must be pressurized to a positive pressure by the mechanically driven supercharger. The amount of compression applied by the mechanically driven supercharger is proportional to the difference between the pressure on the suction side and the pressure on the discharge side of the mechanically driven supercharger, and therefore, the bigger this difference in pressure, the larger the amount of compression needed by the mechanically driven supercharger. Consequently, where the mechanically driven supercharger is arranged in the intake passage downstream of the throttle valve, if the engine is operating under a light load, as when idling, since the difference between the pressure on the suction side and the pressure on the discharge side of the mechanically driven supercharger becomes great, the amount of compression needed by the mechanically driven supercharger is increased. As a result, the loss of engine power for driving the mechanically driven supercharger is increased, and thus a problem occurs in that the fuel consumption will be increased. Further, when the amount of compression by the mechanically driven supercharger is increased, the temperature of the air discharged from the mechanically driven supercharger becomes high, and thus another problem occurs in that knocking or self-ignition will occur. Consequently, to avoid the above-mentioned problems, it is preferable to lower the level of vacuum generated on the suction side of the mechanically driven supercharger. But, if the level of vacuum produced on the suction side of the mechanically driven supercharger is excessively lowered, another problem occurs in that the engine speed can not be stabilized.

Namely, when a vacuum produced on the suction side of the mechanically driven supercharger, i.e., a vacuum produced in the intake passage downstream of the throttle valve, is great the velocity of air passing through the throttle valve becomes close to the velocity of sound, and as a result, the engine speed has little influence on the amount of air passing through the throttle valve, and thus this amount of air is maintained at an approximately constant value. Consequently, as illustrated by the curved lines A and B in FIG. 14, if the engine speed NE is increased beyond $NE_0$, since the amount of air fed into the engine cylinders per one revolution of the engine is decreased, the output torque of the engine is reduced, and thus the engine speed NE is reduced. Conversely, if the engine speed NE is decreased below $NE_0$, since the amount of air fed into the engine cylinders per one revolution of the engine is increased, the output torque of the engine is increased, and thus the engine speed NE is increased. Consequently, the engine speed NE is maintained at $NE_0$. In FIG. 14, the curved line A illustrates the case wherein a vacuum produced in the intake passage downstream of the throttle valve is great, compared with the case illustrated by the curved line B, and thus it will be understood from FIG. 14 that the engine speed NE becomes more stable as a vacuum produced in the intake passage downstream of the throttle valve becomes greater.

Conversely, when the level of vacuum produced in the intake passage downstream of the throttle valve is small, even if the engine speed NE is increased beyond $NE_0$, and a vacuum produced in the intake passage downstream of the throttle valve becomes greater, the amount of air fed into the engine cylinders per one revolution of the engine is not greatly decreased. Consequently, as illustrated by the broken line C in FIG. 14, the output torque of the engine is not greatly decreased. Further, when the engine speed NE is decreased below $NE_0$, the output torque of the engine is not greatly increased. Therefore, when the engine speed NE deviates from $NE_0$, the engine speed NE can not be easily returned to $NE_0$, and thus the engine speed NE is not stabilized.

Consequently, to reduce the loss of engine power for driving the mechanically driven supercharger, prevent knocking or self-ignition, and stabilize the engine speed, it is necessary to maintain the level of vacuum produced in the intake passage downstream of the throttle valve at a fixed level which is not too high and not too low. The above-mentioned Japanese Unexamined Patent Publication No. 61-83460, however, does not teach the concept of controlling the level of a vacuum produced in the intake passage downstream of the throttle valve.

SUMMARY OF THE INVENTION

An object of the present invention is to provide an intake device capable of reducing the fuel consumption and stabilizing the engine speed while preventing knocking or self-ignition during idling.

According to the present invention, there is provided an intake device of a two stroke engine; comprising: an intake passage having a throttle valve therein; a mechanically driven supercharger driven by the engine and arranged in the intake passage downstream of the throttle valve; a bypass air passage branched from the intake passage, between the throttle valve and the supercharger, and connect to the intake passage downstream of the supercharger; a bypass air control valve arranged in the bypass air passage; detecting means for detecting a level of vacuum in the intake passage between the throttle valve and the supercharger, and producing an output signal representing the level of vacuum; and a bypass control means for controlling a degree of opening of the bypass air control valve in response to a signal output by the detecting means, to bring the level of vacuum to a predetermined level when the engine is idling.

The present invention may be more fully understood from the description of preferred embodiments of the invention set forth below, together with the accompanying drawings.

BRIEF DESCRIPTION OF THE DRAWINGS

In the drawings:

FIG. 8, 8($a$), 8($b$) and 8($c$) are diagrams illustrating the desired degrees of opening of the throttle valve and the bypass air control valve, illustrating the absolute pressure in the intake duct downstream of the throttle valve, and illustrating the charging pressure;

FIG. 11($a$)–11($c$) are diagrams illustrating the desired degrees of opening of the throttle valve and the bypass air control valve, illustrating the absolute pressure in the intake duct downstream of the throttle valve, and illustrating the charging pressure;

DESCRIPTION OF THE PREFERRED EMBODIMENTS

Figure 1:
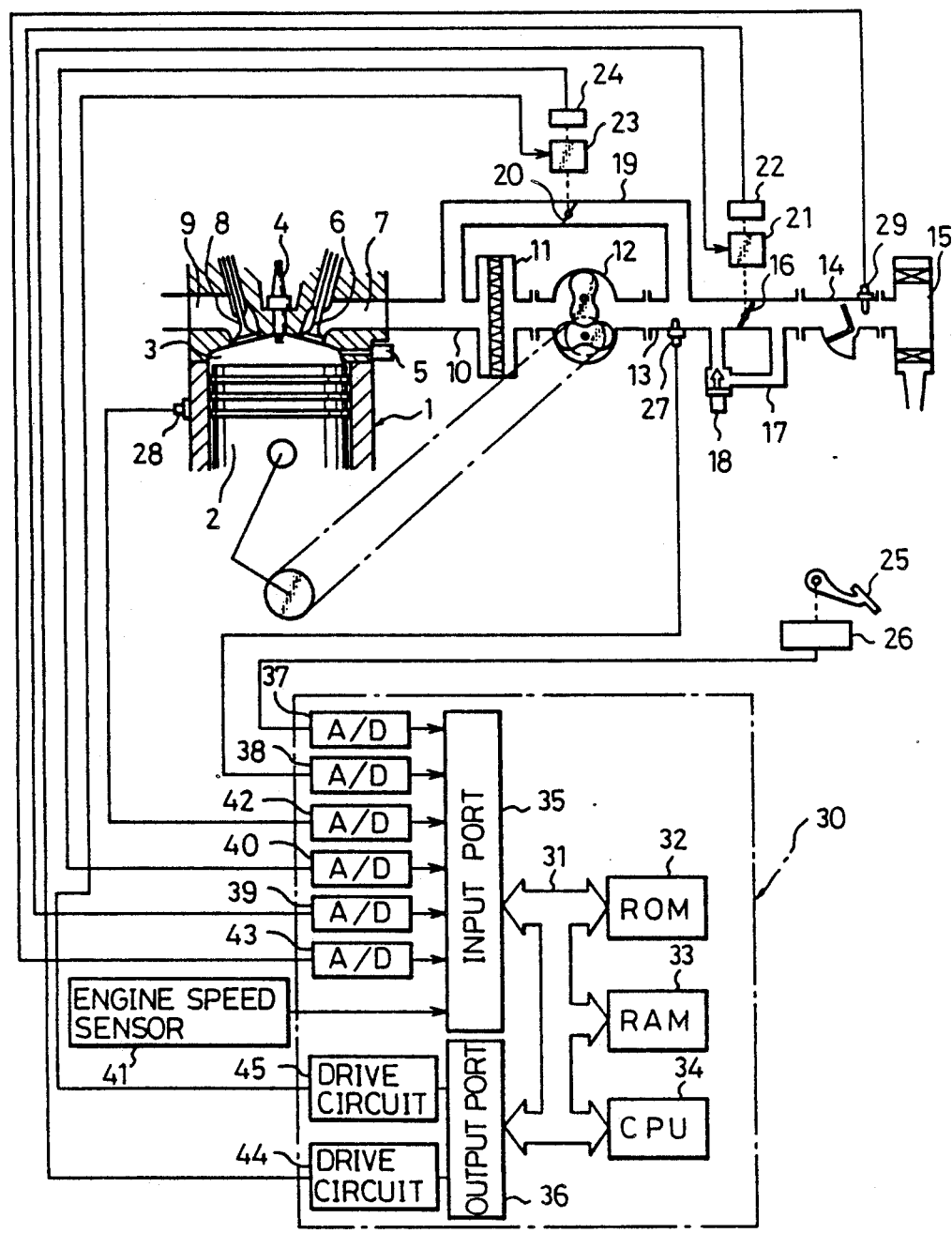
FIG. 1 is a schematically illustrated cross-sectional side view of a two stroke engine.

Referring to FIG. 1, 1 designates a two stroke engine body, 2 a piston, 3 a combustion chamber, 4 a spark plug; 5 an air blast valve for injecting fuel by using pressurized air, 6 an intake valve, 7 an intake port, 8 an exhaust valve, and 9 an exhaust port. The intake port 7 is connected, via an intake duct 10 and an inter cooler 11, to the discharge side of a mechanically driven supercharger 12 driven by the engine, and the suction side of the mechanically driven supercharger 12 is connected to an air cleaner 15 via an intake duct 13 and an air flow meter 14. A throttle valve 16 is arranged in the intake duct 13, and a bypass air passage 17 bypassing the throttle valve 16 is connected to the intake duct 13. A bypass air control valve 18 is arranged in the bypass air passage 17 to control the amount of bypass air, and during idle, the amount of bypass air flowing within the bypass air passage 17 is controlled by the bypass air control valve 18 so that the engine speed is equal to a desired idling speed.

Another bypass air passage 19 is branched from the intake duct 13 between the mechanically driven supercharger 12 and the throttle valve 16 and connected to the intake duct 10 downstream of the mechanically driven supercharger 12, and a bypass air control valve 20 is arranged in the bypass air passage 19. An actuator 21 for actuating the throttle valve 16 and a potentiometer 22 for detecting the degree of opening of the throttle valve 16 are connected to the throttle valve 16. Further, an actuator 23 for actuating the bypass air control valve 20 and a potentiometer 24 for detecting the degree of opening of the bypass air control valve 20 are connected to the bypass air control valve 20. These actuators 21 and 23 are formed by a stepping motor or by a vacuum operated diaphragm apparatus in which the level of vacuum in the vacuum chamber thereof is controlled by a solenoid valve, and this stepping motor or solenoid valve is controlled by signals output by an electronic control unit 30.

The electronic control unit 30 is constructed as a digital computer, and comprises a ROM (read only memory) 32, a RAM (random access memory) 33, a CPU (microprocessor, etc.) 34, an input port 35, and an output 36. The ROM 32, the RAM 33, the CPU 34, the input port 35, and the output port 36 are interconnected by a bidirectional bus 31.

An accelerator pedal 25 is connected to a potentiometer 26 producing an output voltage proportional to the depression of the accelerator pedal 25, and the output voltage of the potentiometer 26 is input to the input port 35 via an AD converter 37. Further, an absolute pressure sensor 27 is arranged in the intake duct 13 between the mechanically driven supercharger 12 and the throttle valve 16. This absolute pressure sensor 29 produces an output voltage proportional to the absolute pressure in the intake duct 13, and the output voltage of the absolute pressure sensor 27 is input to the input port 35 via an AD converter 38. The potentiometer 22 produces an output voltage proportional to the degree of opening of the throttle valve 16, and the output voltage of the potentiometer 22 is input to the input port 35 via an AD converter 39. The potentiometer 24 produces an output voltage proportional to the degree of opening of the bypass air control valve 20, and the output voltage of the potentiometer 24 is input to the input port 35 via an AD converter 40. Further, an engine speed sensor 41 produces an output signal representing the engine speed, and this output signal is input to the input port 35.

A coolant temperature sensor 28 is mounted on the engine body 1, to detect the temperature of engine cooling water, and an air temperature sensor 29 is arranged in the air flow meter 14 to detect the temperature of air fed into the engine cylinders, i.e., the temperature of the outside air. The coolant temperature sensor 28 produces an output voltage proportional to the temperature of engine cooling water, and the output voltage of the coolant temperature sensor 28 is input to the input port 35 via an AD converter 42. The air temperature sensor 29 produces an output voltage proportional to the temperature of air fed into the engine cylinders, and the output voltage of the air temperature sensor 29 is input to the input port 35 via an AD converter 43. The output port 36 is connected to the actuators 21 and 23 via corresponding drive circuits 44 and 45.

Next, the control of the degrees of opening of the throttle valve 16 and the bypass air control valve 20 will be described with reference to FIG. 2.

Figure 2A:
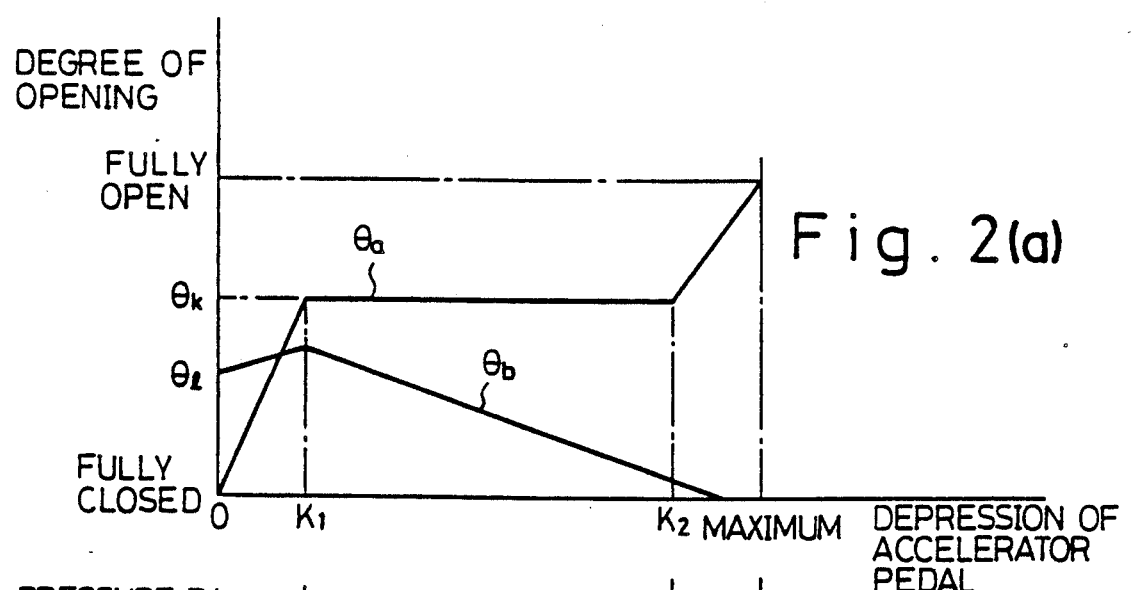
FIG. 2($a$) and 2($b$) are diagrams illustrating the desired degrees of opening of the throttle valve and the bypass air control valve, and illustrating the absolute pressure in the intake duct downstream of the throttle valve.
Figure 2B:
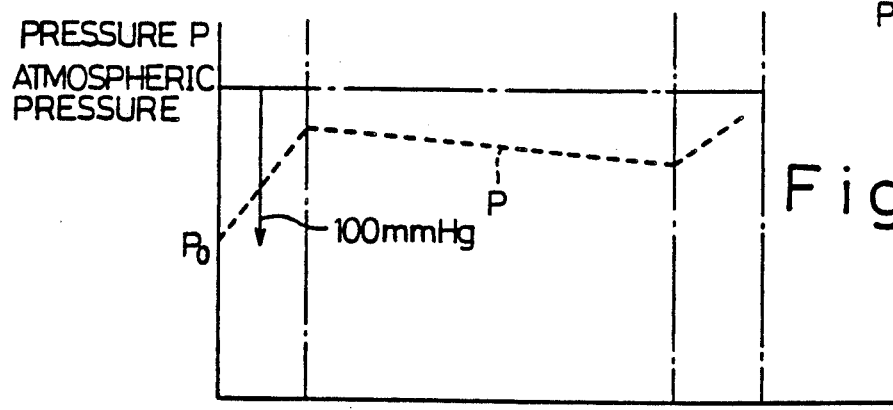

In FIG. 2, $\theta_{a0}$ indicates a desired degree of opening of the throttle valve 16, and $\theta_{b0}$ indicates a desired degree of opening of the bypass air control valve 20. In addition, in FIG. 2, P indicates an absolute pressure in the intake duct 13 between the mechanically driven supercharger 12 and the throttle valve 16. The abscissa of FIG. 2 indicates the depression of the accelerator pedal 25. The throttle valve 16 and the bypass air control valve 20 are controlled by the actuators 21 and 23 so that the degrees of opening of the throttle valve 16 and the bypass air control valve 20 are equal to the desired degrees of opening of $\theta_{a0}$ and $\theta_{b0}$, respectively.

As illustrated in FIG. 2, when the depression of the accelerator pedal 25 is equal to zero, i.e., when the engine is idling, the throttle valve 16 is maintained at the fully closed position. At this time, the amount of air flowing within the bypass air passage 17 is controlled by the bypass air control valve 18 so that the engine speed becomes equal to a desired idling speed.

Figure 14:
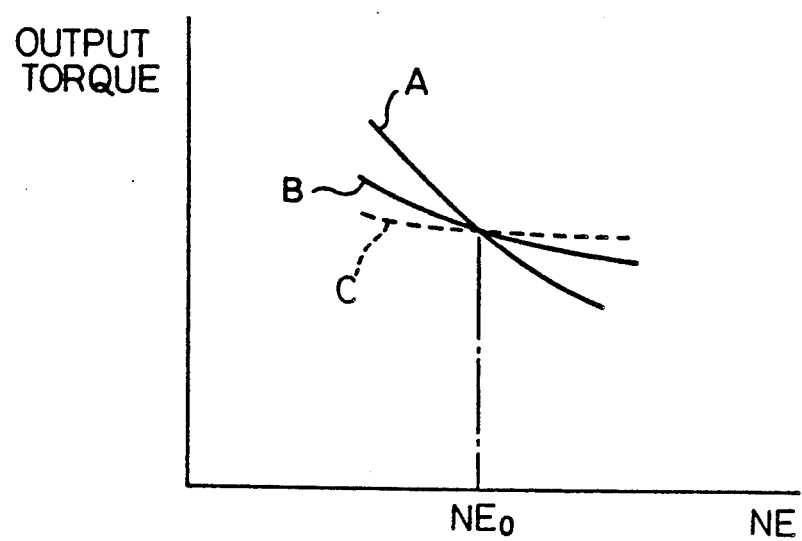

Conversely, during idling, the bypass air control valve 20 is open, and therefore, at this time, a part of the air discharged from the mechanically driven supercharger 12 into the intake duct 10 is returned to the intake duct 13 via the bypass air passage 19. As a result, the absolute pressure in the intake duct 13 downstream of the throttle valve 16 is increased, i.e., the level of vacuum in the intake duct 13 downstream of the throttle valve 16 becomes low. At this time, the degree of opening of the bypass air control valve 20 is controlled on the basis of the output signal of the absolute pressure sensor 27, so that the level of vacuum in the intake duct 13 downstream of the throttle valve 16 becomes equal to a predetermined fixed level, for example, about $-100$ mmHg. At this time, the degree of opening of the bypass air control valve 20 is approximately equal to $\theta_l$, and the relationship between the engine speed NE and the output torque of the engine becomes as illustrated by the curved line A in FIG. 14. The engine speed has a tendency to fluctuate most when the engine is idling. Consequently, when the engine is idling, the level of vacuum in the intake duct 13 downstream of the throttle valve 16 is slightly increased, to stabilize the engine speed.

As illustrated in FIG. 2, while the accelerator pedal 25 is depressed to reach $K_1$, the throttle valve 16 is gradually opened from the fully closed state to a half open state $\theta_k$, and at the same time, the bypass air control valve 20 is gradually opened from $\theta_l$ at an opening rate which is lower than that of the throttle valve 16. The degree of opening of the bypass air control valve 20 reached when the depression of the accelerator pedal 25 becomes equal to $K_1$, is determined such that the level of vacuum in the intake duct 13 downstream of the throttle valve 16 becomes lower than, for example, about $-30$ mmHg, when the depression of the accelerator pedal 25 reaches $K_1$. Namely, when the throttle valve 16 is opened to a certain extent, whereby the engine speed is increased, the engine speed is stabilized compared with the case wherein the engine is idling. Consequently, at this time, if the level of vacuum in the intake duct 13 downstream of the throttle valve 16 becomes equal to a level which establishes the relationship illustrated by the curved line B, such a level of vacuum is sufficient to stabilize the engine speed. Further, if the level of vacuum in the intake duct 13 becomes equal to a low level such as $-30$ mmHg, since the amount of compression needed by the mechanically driven supercharger 12 is reduced, the fuel consumption is lowered. Also, since the temperature of the air discharged from the mechanically driven supercharger 12 is lowered, it is possible to prevent knocking or self-ignition.

When the depression of the accelerator pedal 25 is from $K_1$ to $K_2$, the degree of opening of the throttle valve 16 is maintained at a fixed desired degree of opening $\theta_{a0}$. At this time, the degree of opening of the bypass air control valve 20 is gradually reduced along the desired degree of opening $\theta_{b0}$ as the accelerator pedal 25 is depressed. Namely, when the depression of the accelerator pedal 25 is from $K_1$ to $K_2$, the amount of air fed into the engine cylinders is controlled by the bypass air control valve 20. When the degree of opening of the bypass air control valve 20 is decreased, since the absolute pressure in the intake duct 10 downstream of the mechanically driven supercharger 12 becomes high, the amount of air fed into the engine cylinders is increased. At this time, however, since the throttle valve 16 is open by a relatively large amount, the vacuum in the intake duct 13 downstream of the throttle valve 16 is maintained at a low level.

Consequently, since the amount of compression needed by the mechanically driven supercharger 12 is small, the fuel consumption is lowered. Further, since the temperature of the air discharged from the mechanically driven supercharger 12 is low, it is possible to prevent knocking and self-ignition.

When the depression of the accelerator pedal 25 is increased beyond $K_2$, the throttle valve 16 is opened toward the fully open position. As can be seen from FIG. 2, the bypass air control valve 20 is fully closed after the throttle valve 16 is opened toward the fully open position from $K_2$; i.e., the amount of air fed into the engine cylinders is controlled by both the throttle valve 16 and the bypass air control valve 20 immediately before the bypass air control valve 20 is fully closed.

Immediately before the bypass air control valve 20 is fully closed, when the degree of opening the bypass air control valve 20 is slightly changed, the amount of air fed into the engine cylinders is considerably changed. At this time, however, if the amount of air fed into the engine cylinders is controlled by the throttle valve 16, a change in the amount of air controlled by the throttle valve 16 becomes larger than the change in the amount of air controlled by the throttle valve 16. Namely, such a change in the amount of air is governed by the throttle valve 16, and consequently, it is possible to smoothly change the amount of air fed into the engine cylinders immediately before the bypass air control valve 20 is fully closed. The relationships between the desired degree of opening $\theta_{a0}$, $\theta_{b0}$ and the depression of the accelerator pedal 25 illustrated in FIG. 2 are stored in the ROM 32.

Figure 3:
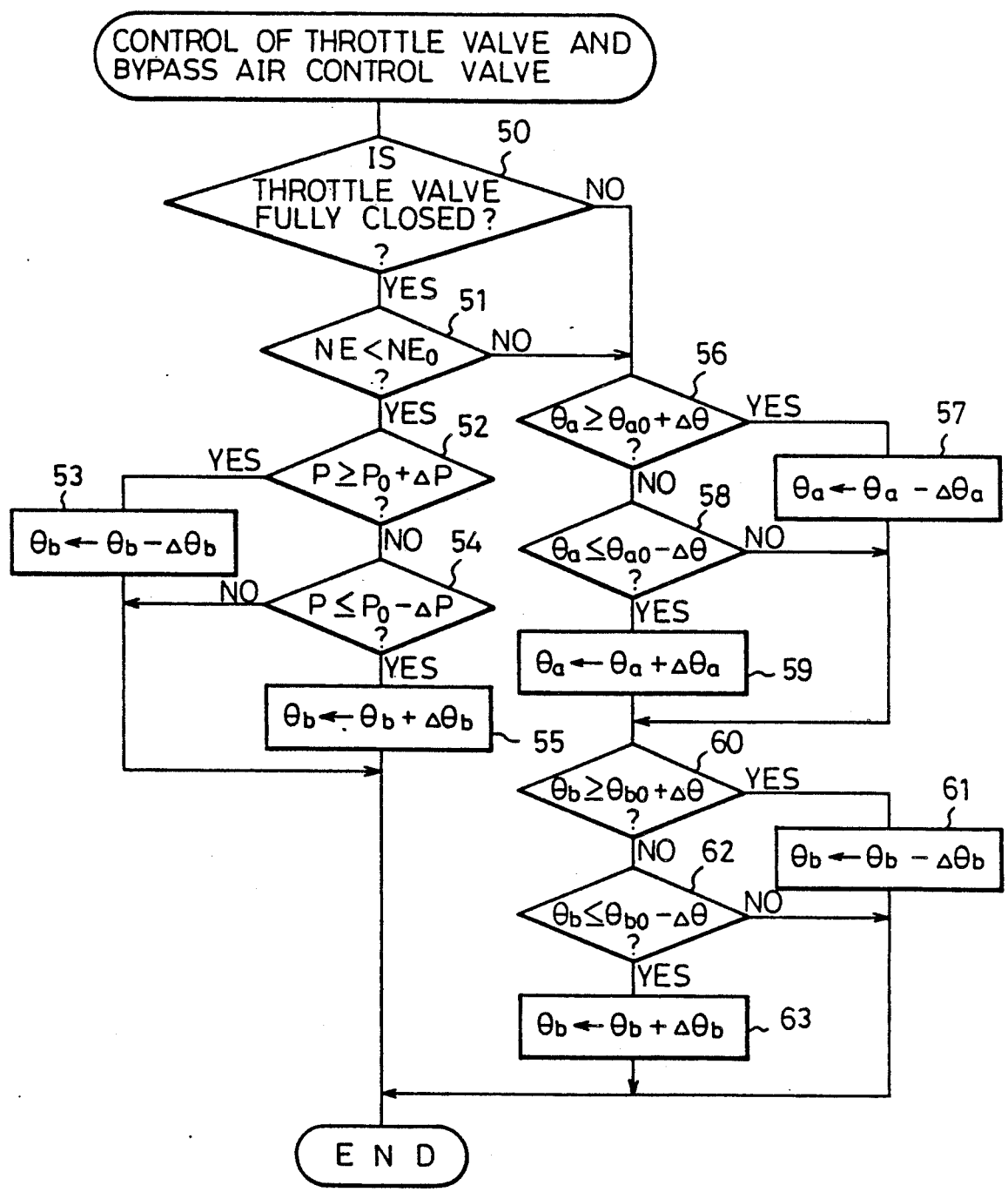
FIG. 3 is a flow chart for executing the control illustrated in FIG. 2.

FIG. 3 illustrates a routine for executing the control of the degree of opening of the throttle valve 16 and the bypass air control valve 20. This routine is processed by sequential interruptions executed at predetermined intervals.

Referring to FIG. 3, in step 50, it is determined from the output signal of the potentiometer 22 whether or not the throttle valve 16 is fully closed. When the throttle valve 16 is fully closed, the routine goes to step 51, and it is determined on the basis of the output signal of the engine speed sensor 41 whether or not the engine speed NE is lower than a predetermined engine speed $NE_0$. If $NE<NE_0$, i.e., when the engine is idling, the routine goes to step 52, and it is determined from the output signal of the absolute pressure sensor 27, whether or not the absolute pressure P in the intake duct 13 downstream of the throttle valve 16 is higher than the pressure $(P_0+\Delta P)$ obtained by adding a small value $\Delta P$ to the desired absolute pressure $P_0$ (corresponds to, for example, $-100$ mmHg). If $P \geq P_0+\Delta P$, the routine goes to step 53, and the control signal for decreasing the degree of opening $\theta_b$ of the bypass air control valve 20 by $\Delta \theta_b$ is supplied to the actuator 23. Conversely, if $P<P_0+\Delta P$, the routine goes to step 54, and it is determined whether or not the absolute pressure P is lower than $(P_0-\Delta P)$. If $P \leq P_0-\Delta P$, the routine goes to step 55, and the control signal for increasing the degree of opening $\theta_b$ of the bypass air control valve 20 by $\Delta \theta_b$ is supplied to the actuator 21. As a result, the absolute pressure P in the intake duct 13 downstream of the throttle valve 16 is maintained within the range of from $(P_0-\Delta P)$ to $(P_0+\Delta P)$. When the engine is not idling, the routine goes to step 56, and it is determined from the output signal of the potentiometer 22 whether or not the degree of opening $\theta_a$ of the throttle valve 16 is larger than the degree of opening $(\theta_{a0}+\Delta \theta)$ obtained by adding a small value $\Delta \theta$ to the desired degree of opening $\theta_{a0}$ illustrated in FIG. 2. If $\theta_a \geq \theta_{a0}+\Delta \theta$, the routine goes to step 57, and the control signal for decreasing the degree of opening $\theta_a$ by $\Delta \theta_a$ is supplied to the actuator 21. Conversely, if $\theta_a<\theta_{a0}+\Delta \theta_a$, the routine goes to step 58, and it is determined whether or not the degree of opening $\theta_a$ of the throttle valve 16 is smaller than $(\theta_{a0}-\Delta \theta)$. If $\theta_a \leq \theta_{a0}-\Delta \theta$, the routine goes to step 59, and the control signal for increasing the degree of opening $\theta_a$ of the throttle valve 16 by $\Delta \theta_a$ is supplied to the actuator 21. Consequently, the degree of opening $\theta_a$ of the throttle valve 16 is maintained within the range of from $(\theta_{a0}-\Delta \theta)$ to $(\theta_{a0}+\Delta \theta)$.

In step 60, it is determined from the output signal of the potentiometer 24 whether or not the degree of opening $\theta_b$ of the bypass air control valve 20 is larger than the degree of opening $(\theta_{b0}+\Delta \theta)$ obtained by adding a small value $\Delta \theta$ to the desired degree of opening $\theta_{b0}$ illustrated in FIG. 2. If $\theta_b \geq \theta_{b0}+\Delta \theta$, the routine goes to step 61, and the control signal for decreasing the degree of opening $\theta_b$ of the bypass air control valve 20 by $\Delta \theta_b$ is supplied to the actuator 23. Conversely, if $\theta_b<\theta_{b0}+\Delta \theta$, the routine goes to step 62, and it is determined whether or not the degree of opening $\theta_b$ of the bypass air control valve 20 is smaller than $(\theta_{b0}-\Delta \theta)$. If $\theta_b \leq \theta_{b0}-\Delta \theta$, the routine goes to step 63, and the control signal for increasing the degree of opening $\theta_b$ of the bypass air control valve 20 by $\Delta \theta_b$ is supplied to the actuator 23. As a result, the degree of opening $\theta_b$ of the bypass air control valve 20 is maintained within the range of from $(\theta_{b0}-\Delta \theta)$ to $(\theta_{b0}+\Delta \theta)$.

In a two-stroke engine as illustrated in FIG. 1, when the engine temperature or the outside air temperature is low, since the fuel is not sufficiently vaporized a good combustion can not be obtained. At this time, if the level of vacuum in the intake duct 13 downstream of the throttle valve 16 is slightly increased, since the temperature of air discharged from the mechanically driven supercharger 12 is increased, fuel is sufficiently vaporized and thus a good combustion can be obtained. In addition, when the engine temperature or the outside air temperature is low, even if the temperature of air discharged from the mechanically driven supercharger 12 is increased, the combustion temperature is not greatly increased, and thus there is no danger of knocking o self-ignition. Consequently, preferably the level of vacuum in the intake duct 13 downstream of the throttle valve 16 is controlled in accordance with a change in the engine temperature or the outside temperature.

Figure 4A:
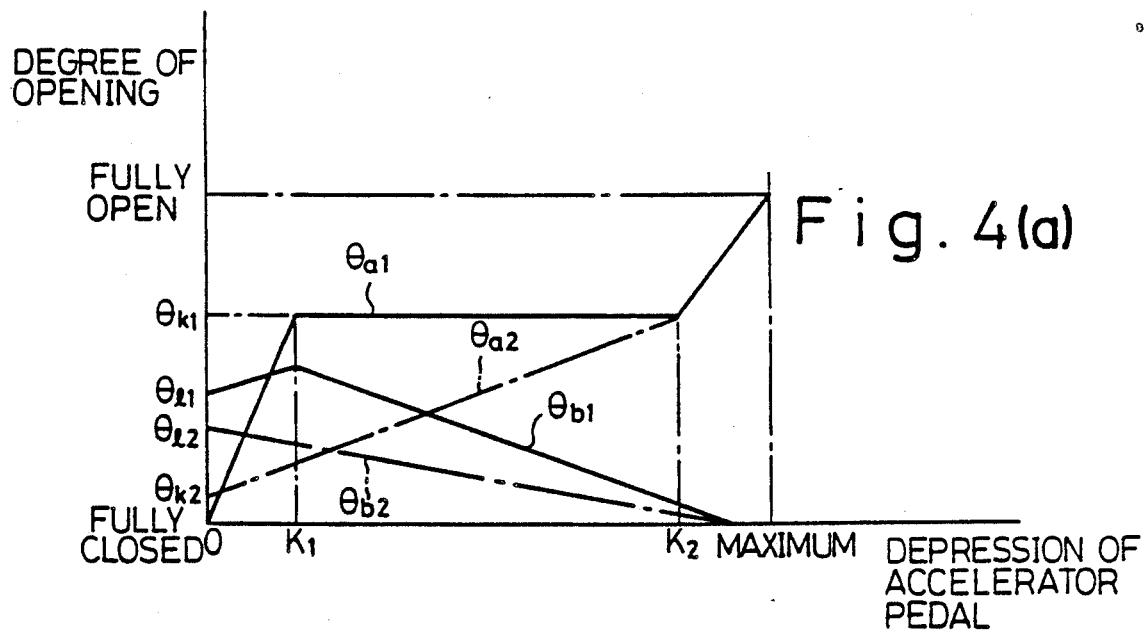
FIG. 4($a$) and 4($b$) are diagrams illustrating the desired degrees of opening of the throttle valve and the bypass air control valve, and illustrating the absolute pressure in the intake duct downstream of the throttle valve.
Figure 4B:
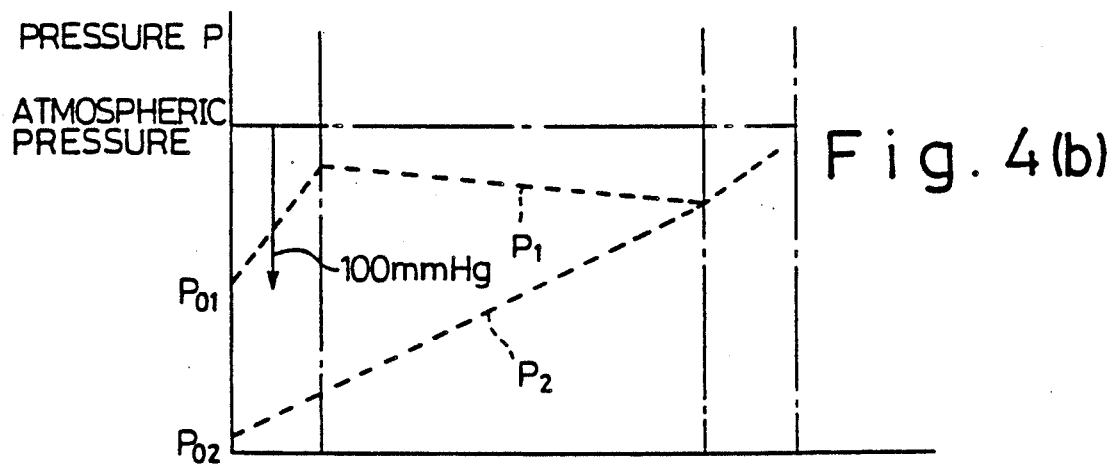

FIG. 4 illustrates another embodiment in which the degree of opening of the throttle valve 12 and the bypass air control valve 20 are controlled in accordance with a change in the engine temperature or the outside air temperature.

In FIG. 4, $\theta_{a1}$ indicates a desired degree of opening of the throttle valve 16 when the engine temperature or the outside air temperature is relatively high, and $\theta_{b1}$ indicates a desired degree of opening of the bypass air control valve 20 when the engine temperature or the outside air temperature is relatively high. $P_1$ indicates an absolute pressure in the intake duct 13 between the mechanically driven supercharger 12 and the throttle valve 16. When the engine temperature or the outside air temperature is relatively high.

Conversely, $\theta_{a1}$ indicates a desired degree of opening of the throttle valve 16 when the engine temperature or the outside air temperature is relatively low, and $\theta_{b2}$ indicates a desired degree of opening of the bypass air control valve 20 when the engine temperature or the outside air temperature is relatively low. $P_2$ indicates an absolute pressure in the intake duct 13 between the mechanically driven supercharger 12 and the throttle valve 16 when the engine temperature or the outside air temperature is relatively low.

The abscissa of FIG. 2 indicates the depression of the accelerator pedal 25. The throttle valve 16 and the bypass air control valve 20 are controlled by the actuators 21 and 23 so that the degrees of opening of the throttle valve 16 and the bypass air control valve 20 become equal to the corresponding desired degrees of opening $\theta_{a1}$, $\theta_{a2}$, $\theta_{b1}$ and $\theta_{b2}$.

First, the control of the degrees of opening of the throttle valve 16 and the bypass air control valve 20, which is carried out when the engine temperature or the outside air temperature is relatively high, will be described. This control is carried out in the same manner as described with reference to FIG. 2. Namely, as illustrated in FIG. 4, when the depression of the accelerator pedal 25 is equal to zero, i.e., when the engine is idling, the throttle valve 16 is maintained at the fully closed position. At this time, the amount of air flowing within the bypass air passage 17 is controlled by the bypass air control valve 18 so that the engine speed becomes equal to a desired idling speed.

Conversely, during idling, the bypass air control valve 20 is open, and therefore, at this time a part of the air discharged from the mechanically driven supercharger 12 into the intake duct 10 is returned to the intake duct 13 via the bypass air passage 19. As a result, the absolute pressure in the intake duct 13 downstream of the throttle valve 16 is increased, i.e., the level of vacuum in the intake duct 13 downstream of the throttle valve 16 becomes low. At this time, the degree of opening of the bypass air control valve 20 is controlled on the basis of the output signal of the absolute pressure sensor 27 so that the level of vacuum in the intake duct 13 downstream of the throttle valve 16 becomes equal to a predetermined fixed level, for example, about $-100$ mmHg. At this time, the degree of opening of the bypass air control valve 20 becomes approximately equal to $\theta_{l1}$, and the relationship between the engine speed NE and the output torque of the engine becomes as illustrated by the curved line A in FIG. 14.

As illustrated in FIG. 4, while the accelerator pedal 25 is depressed to $K_1$, the throttle valve 16 is gradually opened from the fully closed state to a half open state $\theta_{k1}$, and at the same time, the bypass air control valve 20 is gradually opened from $\theta_{l1}$ at an opening rate lower than that of the throttle valve 16. The degree of opening of the bypass air control valve 20, which is reached when the depression of the accelerator pedal 25 becomes equal to $K_1$, is determined so that the level of vacuum in the intake duct 13 downstream of the throttle valve 16 becomes lower than, for example, about $-30$ mmHg, when the depression of the accelerator pedal 25 becomes equal to $K_1$.

When the depression of the accelerator pedal 25 is from $K_1$ to $K_2$, the degree of opening of the throttle valve 16 is maintained at a fixed desired degree of opening $\theta_{a1}$. At this time, the degree of opening of the throttle valve 16 is gradually reduced along the desired degree of opening $\theta_{b1}$ as the accelerator pedal 25 is depressed.

When the depression of the accelerator pedal 25 is increased beyond $K_2$, the throttle valve 16 is opened toward the fully open position. As can be seen from FIG. 4, the bypass air control valve 20 is fully closed after the throttle valve 16 is opened toward the fully open position from $K_2$. Namely, the amount of air fed into the engine cylinders is controlled by both the throttle valve 16 and the bypass air control valve 20 immediately before the bypass air control valve 20 is fully closed.

Next, the control of the degrees of opening of the throttle valve 16 and the bypass air control valve 20, which control is carried out when the engine temperature or the outside air temperature is relatively low, will be described.

As illustrated in FIG. 4, when the depression of the accelerator pedal 25 is equal to zero, i.e., when the engine is idling state, the degree of opening of the throttle valve 16 is maintained at a predetermined small degree of opening $\theta_{k2}$. At this time, the amount of air flowing within the bypass air passage 17 is controlled by the bypass air control valve 18 so that the engine speed becomes equal to a desired idling speed. Further, during idling the bypass air control valve 20 is also open and at this time, the degree of opening of the bypass air control valve 20 is controlled on the basis of the output signal of the absolute pressure sensor 27 so that the level of vacuum $P_{01}$ in the intake duct 13 downstream of the throttle valve 16 becomes equal to a predetermined fixed level $P_{02}$, for example, about $-200$ mmHg, which is larger than the level of vacuum $P_{01}$. At this time, the degree of opening of the bypass air control valve 20 becomes approximately equal to $\theta_{l2}$. As mentioned above, when the engine temperature or the outside air temperature is low during idling, since the level of vacuum in the intake duct 13 downstream of the throttle valve 20 is increased, the temperature of air discharged from the mechanically driven supercharger 12 is increased, and thus a good combustion can be obtained.

As illustrated in FIG. 4, while the accelerator pedal 25 is depressed to $K_2$, the throttle valve 16 is gradually opened from $\theta_{k2}$ to a half open state $\theta_{k1}$, and at this time, the degree of the opening of the bypass air control valve 20 is gradually reduced from $\theta_{l2}$ along the desired degree of opening $\theta_{b0}$ as the accelerator pedal 25 is depressed. At this time, as can be seen from FIG. 4, the level of vacuum $P_2$ in the intake duct 13 downstream of the throttle valve 16 is larger than $P_1$, and thus, since the temperature of air discharged from the mechanically driven supercharger 12 is increased, a good combustion can be obtained.

In the two stroke engine as illustrated in FIG. 1, the amount of air fed into the engine cylinders depends on the charging pressure in the intake duct 10. In the embodiment illustrated in FIG. 4, the degree of opening $\theta_{a2}$ of the throttle valve 16 and the degree of opening $\theta_{b2}$ of the bypass air control valve 20 are determined so that the above mentioned charging pressure becomes approximately equal to that in the case where the engine temperature or the outside air temperature is relatively high, in a state when the depression of the accelerator pedal 25 is the same. Consequently, if the depression of the accelerator pedal 25 is the same, the same amount of air is fed into the engine cylinders regardless of whether the engine temperature or the outside air temperature is high or low. The relationships between the desired degree of opening $\theta_{a2}$, $\theta_{b2}$ and the depression of the accelerator pedal 25 illustrated in FIG. 4 are stored in the ROM 32.

Figure 5:
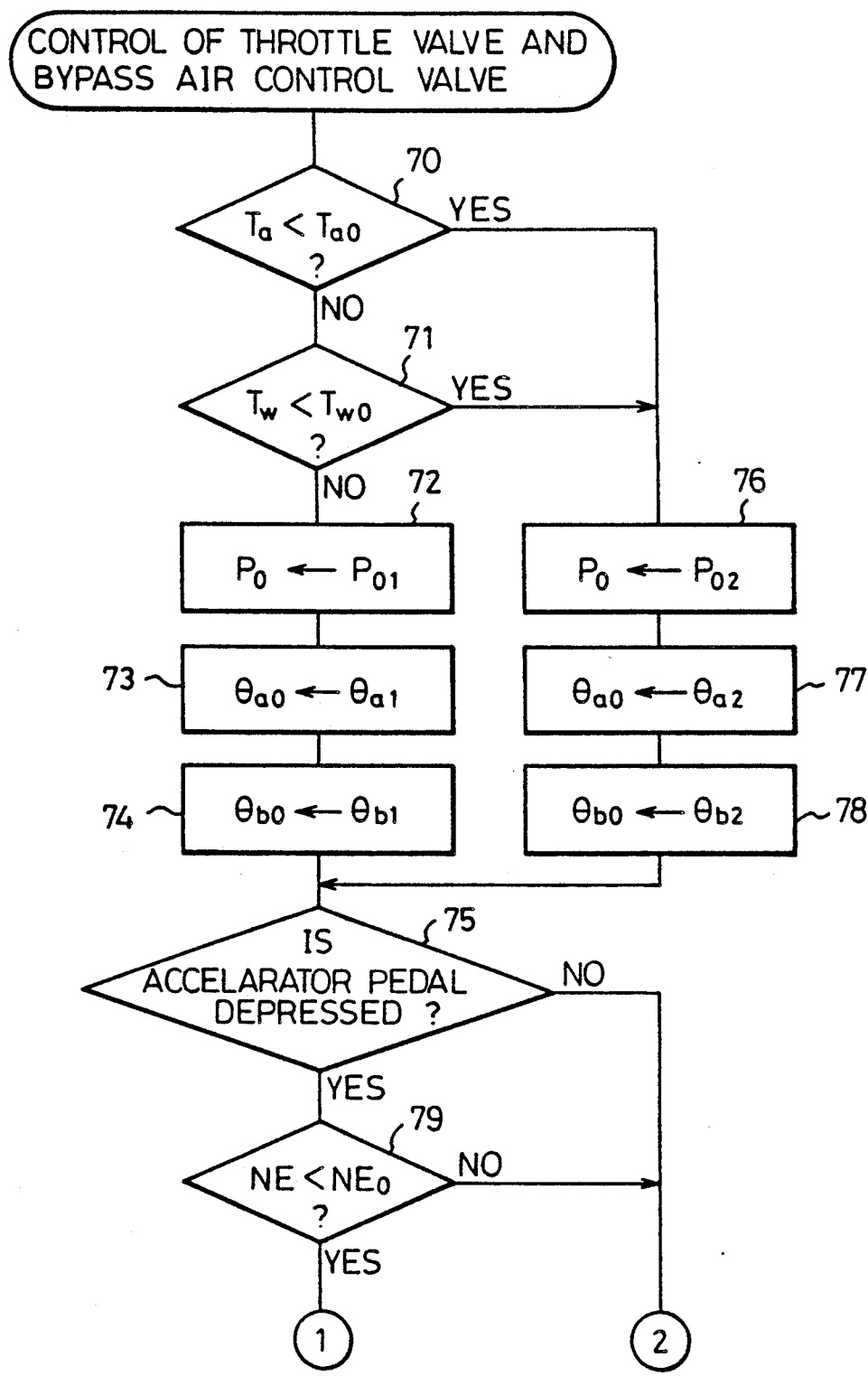
FIGS. 5 and 6 are a flow chart for executing the control illustrated in FIG. 4.
Figure 6:
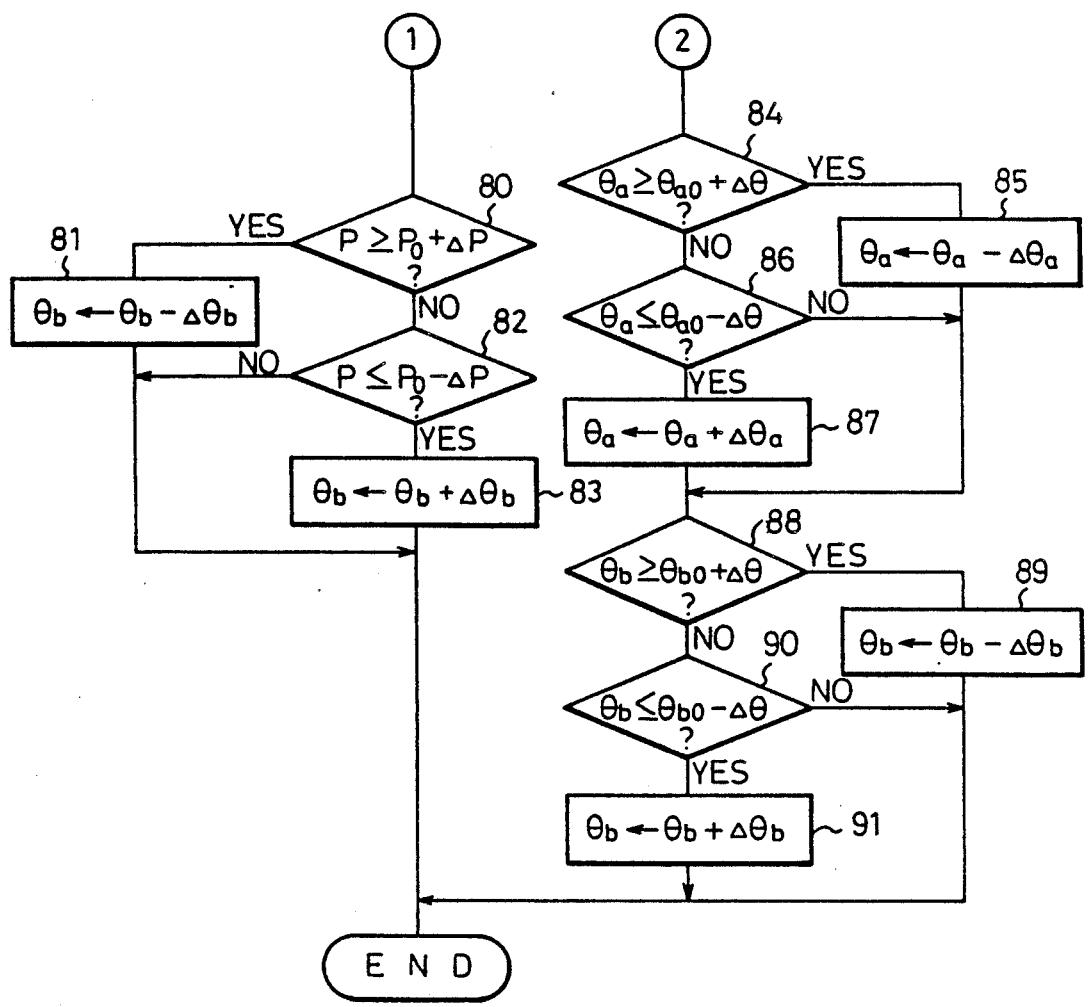

FIGS. 5 and 6 illustrate a routine for executing the control of the degrees of opening of the throttle valve 16 and the bypass air control valve 20, which control is illustrated in FIG. 4. This routine is processed by sequential interruptions executed at predetermined intervals.

Referring to FIG. 3 and 4, in step 70, it is determined from the output signal of the air temperature sensor 29 whether or not the temperature of the outside air $T_a$ is lower than a predetermined temperature $T_{a0}$. If $T_a \geq T_{a0}$, the routine goes to step 71, and it is determined from the output signal of the coolant temperature sensor 28 whether or not the temperature of the engine cooling water $T_w$ is lower than a predetermined temperature $T_{w0}$. If $T_w \geq T_{w0}$, the routine goes to step 72, and $P_{01}$ is memorized as the desired absolute pressure $P_0$ in the intake duct 13 of the throttle valve 16. Then, in step 73, $\theta_{a1}$ is memorized as the desired degree of opening $\theta_{a0}$ of the throttle valve 16. Then, in step 74, $\theta_{b1}$ is memorized as the desired degree of opening $\theta_{b0}$ of the bypass air control valve 20, and the routine then goes to step 75. Conversely, if $T_a < T_{a0}$, or if $T_w < T_{w0}$, the routine goes to step 76, and $P_{02}$ is memorized as the desired absolute pressure $P_0$ in the intake duct 13 downstream of the throttle valve 16. Then, in step 77, $\theta_{a2}$ is memorized as the desired degree of opening $\theta_{a0}$ of the throttle valve 16. Then in step 78, $\theta_{b2}$ is memorized as the desired degree of opening $\theta_{b0}$ of the bypass air control valve 20, and the routine goes to step 75.

In step 75, it is determined from the output signal of the potentiometer 22 whether or not the depression of the accelerator pedal 25 is equal to zero, i.e., whether or not the accelerator pedal 25 is depressed. When the accelerator pedal 25 is not depressed, the routine goes to step 79, and it is determined on the basis of the output signal of the engine speed sensor 41 whether or not the engine speed NE is lower than a predetermined engine speed $NE_0$. If $NE < NE_0$, i.e., when the engine is idling, the routine goes to step 80, and it is determined from the output signal of the absolute pressure sensor 27 whether or not the absolute pressure P in the intake duct 13 downstream of the throttle valve 16 is higher than the pressure ($P_0 + \Delta P$) obtained by adding a small value $\Delta P$ to the desired absolute pressure $P_0$. If $P \geq P_0 + \Delta P$, the routine goes to step 81, and the control signal for decreasing the degree of opening $\theta_b$ of the bypass air control valve 20 by $\Delta\theta_b$ is supplied to the actuator 23. Conversely, if $P < P_0 + \Delta P$, the routine goes to step 82, and it is determined whether or not the absolute pressure P is lower than ($P_0 - \Delta P$). If $P \leq P_0 - \Delta P$, the routine goes to step 83, and the control signal for increasing the degree of opening $\theta_b$ of the bypass air control valve 20 by $\Delta\theta_b$ is supplied to the actuator 21. As a result, the absolute pressure P in the intake duct 13 downstream of the throttle valve 16 is maintained within the range of from ($P_0 - \Delta P$) to ($P_0 + \Delta P$).

When the engine is not idling, the routine goes to step 84, and it is determined from the output signal of the potentiometer 22 whether or not the degree of opening $\theta_a$ of the throttle valve 16 is larger than the degree of opening ($\theta_{a0} + \Delta\theta$) obtained by adding a small value $\Delta\theta$ to the desired degree of opening $\theta_{a0}$ illustrated in FIG. 4. If $\theta_a \geq \theta_{a0} + \Delta\theta$, the routine goes to step 85, and the control signal for decreasing the degree of opening $\theta_a$ by $\Delta\theta_a$ is supplied to the actuator 21. Conversely, if $\theta_a < \theta_{a0} + \Delta\theta_a$, the routine goes to step 86, and it is determined whether or not the degree of opening $\theta_a$ of the throttle valve 16 is smaller than ($\theta_{a0} - \Delta\theta$). If $\theta_a \leq \theta_{a0} - \Delta\theta$, the routine goes to step 87, and the control signal for increasing the degree of opening $\theta_a$ of the throttle valve 16 by $\Delta\theta_a$ is supplied to the actuator 21. Consequently, the degree of opening $\theta_a$ of the throttle valve 16 is maintained within the range of from ($\theta_{a0} - \Delta\theta$) to ($\theta_{a0} + \Delta\theta$). In step 88, it is determined from the output signal of the potentiometer 24 whether or not the degree of opening $\theta_b$ of the bypass air control valve 20 is larger than the degree of opening ($\theta_{b0} + \Delta\theta$) obtained by adding a small value $\Delta\theta$ to the desired degree of opening $\theta_{b0}$ illustrated in FIG. 4. If $\theta_b \geq \theta_{b0} + \Delta\theta$), the routine goes to step 89, and the control signal for decreasing the degree of opening $\theta_b$ of the bypass air control valve 20 by $\Delta\theta_b$ is supplied to the actuator 23. Conversely, if $\theta_b < \theta_{b0} + \Delta\theta$, the routine goes to step 90, and it is determined whether or not the degree of opening $\theta_b$ of the bypass air control valve 20 is smaller than ($\theta_{b0} - \Delta\theta$). If $\theta_b \leq \theta_{b0} - \Delta\theta$, the routine goes to step 91, and the control signal for increasing the degree of opening $\theta_b$ of the bypass air control valve 20 by $\Delta\theta_b$ is supplied to the actuator 23. As a result, the degree of opening $\theta_b$ of the bypass air control valve 20 is maintained within the range of from ($\theta_{b0} - \Delta\theta$), to ($\theta_{b0} + \Delta\theta$).

FIGS. 7 through 10 illustrate a further embodiment which slightly modifies the embodiment illustrated in FIGS. 1 through 3. As can be seen from FIG. 8, also in this embodiment, when the engine is idling the degree of opening of the bypass air control valve 20 is controlled so that the absolute pressure P in the intake duct 13 downstream of the throttle valve 16 is a predetermined fixed level $P_0$ (corresponds to, for example, $-100$ mmHg).

While the depression of the accelerator pedal 25 is increased to $K_3$, the throttle valve 16 is opened from the fully closed position to the fully open position along the desired degree of opening $\theta_{a0}$. At this time, the bypass air control valve 20 is also opened along the desired degree of opening $\theta_{b0}$ at an opening rate lower than that of the throttle valve 16.

When the depression of the throttle valve 25 exceeds $K_3$, the throttle valve 16 is maintained at a fully open state. At this time, the degree of opening of the bypass air control valve 20 is controlled so that the charging pressure $P_c$ in the intake duct 10 downstream of the mechanically driven supercharger $P_c$ becomes equal to a desired charging pressure $P_{c0}$. The relationship between the depression of the accelerator pedal 25 and the desired degrees of opening $\theta_{a0}$, $\theta_{b0}$ illustrated by the solid lines in FIG. 8, and the relationship between the depression of the accelerator pedal 25 and the desired charging pressure $P_{c0}$ illustrated by a solid line in FIG. 8, are stored in the ROM 32. In FIG. 8, the broken lines indicate changes in the degree of opening and the charging pressure.

Figure 7:
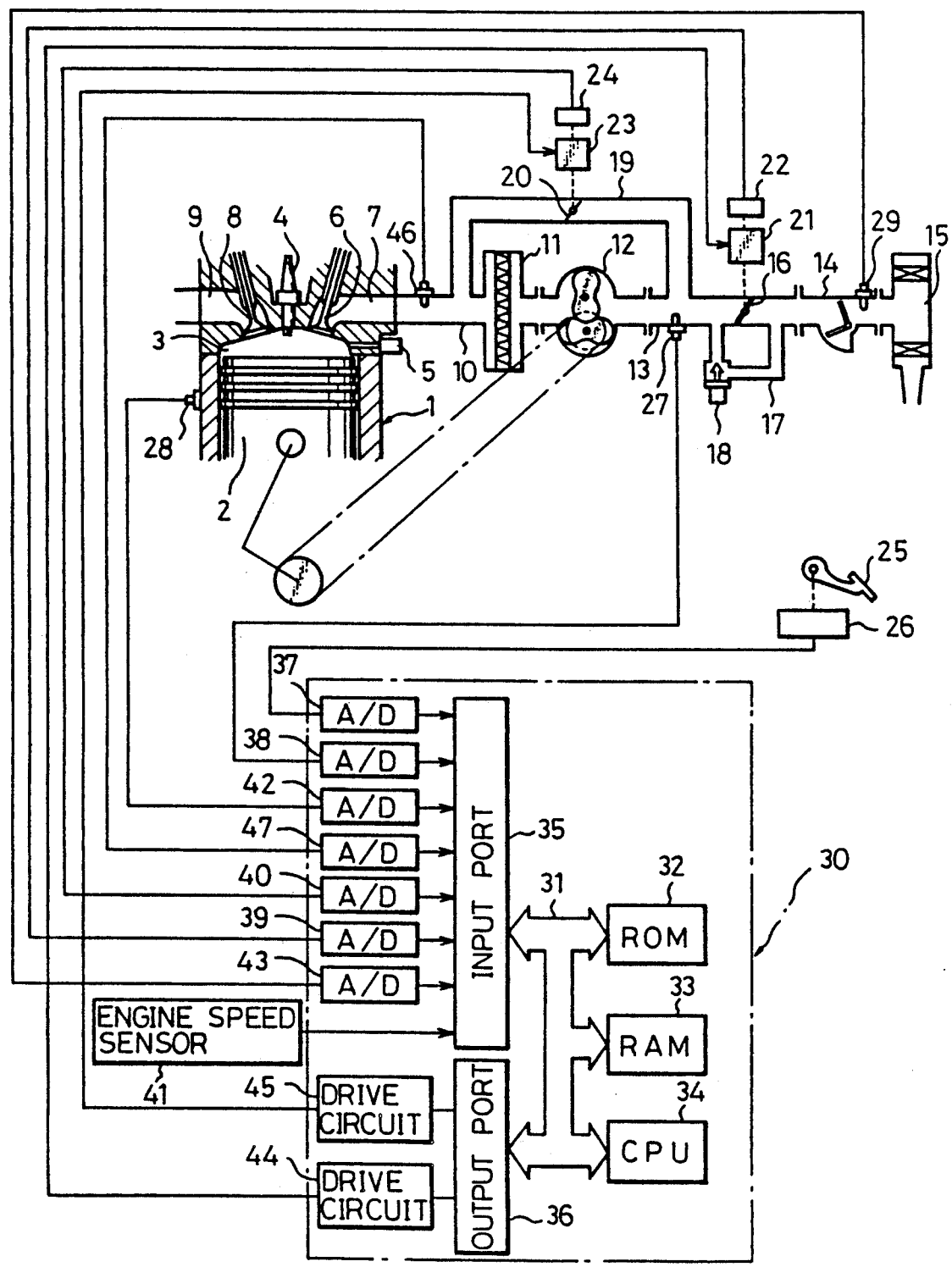
FIG. 7 is a schematically illustrated cross-sectional side view of another two stroke engine.

In this embodiment, when the depression of the accelerator pedal 25 exceeds $K_3$, the amount of air fed into the engine cylinders is controlled based on the charging pressure $P_c$. Consequently, in this embodiment, as illustrated in FIG. 7, an additional absolute pressure sensor 46 is arranged in the intake duct 10 downstream of the mechanically driven supercharger 12 to detect the charging pressure $P_c$. This absolute pressure sensor 46 produces an output voltage proportional to the absolute pressure in the intake duct 10, and this output voltage is input to the input port 35 via an AD converter 47. The remaining parts, except for the absolute pressure sensor 46 and the AD converter 47 of FIG. 7, are the same as FIG. 1, and therefore a description of the remaining parts is omitted.

Figure 9:
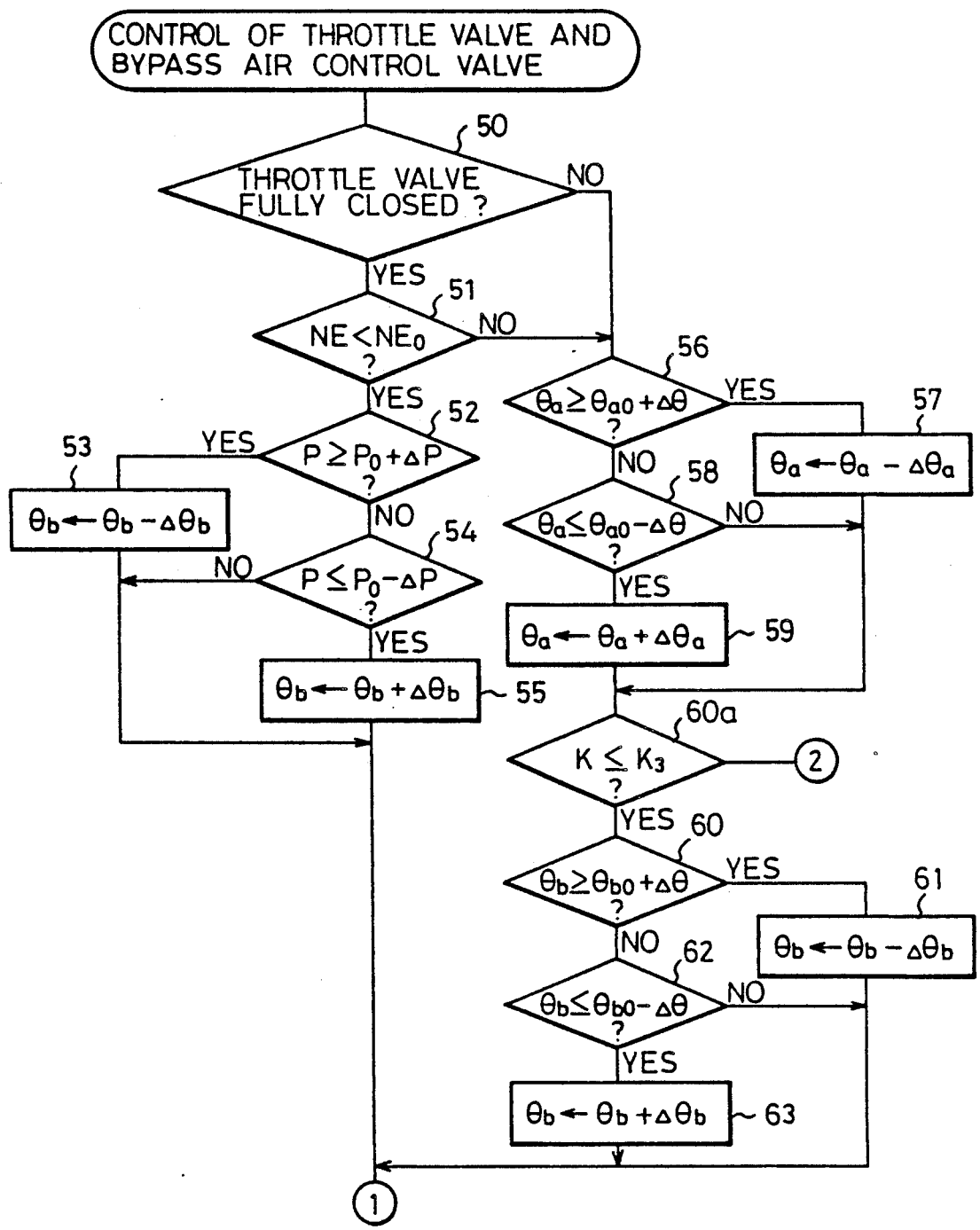
FIGS. 9 and 10 are a flow chart for executing the control illustrated in FIG. 8.
Figure 10:
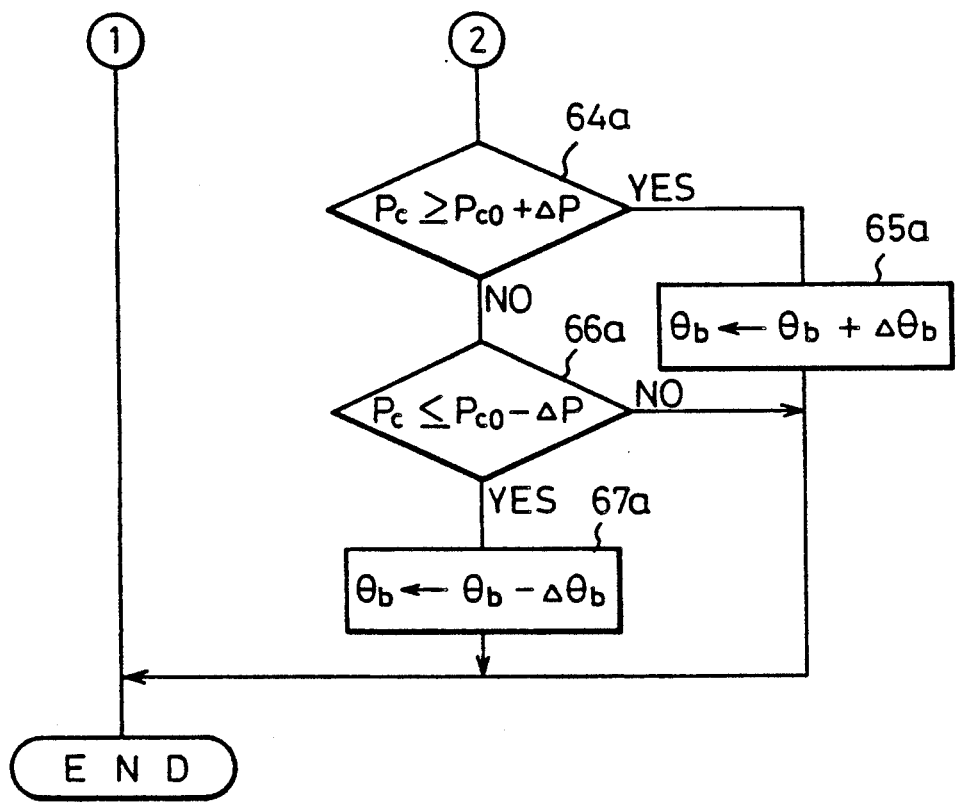

FIGS. 9 and 10 illustrate a routine for executing the control of the degree of opening of the throttle valve 16 and the bypass air control valve 20, as illustrated in FIG. 8. This routine is processed by sequential interruptions executed at predetermined intervals.

The routine illustrated in FIGS. 9 and 10 is different from the routine illustrated in FIG. 3 in that, in FIGS. 9 and 10, step 60a is inserted before step 60, and steps 64a, 65a, 66a and 67a are added. The remaining part of the routine illustrated in FIGS. 9 and 10 is the same as the routine illustrated in FIG. 3, and therefore, the routine illustrated by FIGS. 9 and 10 will be hereinafter described while focusing on steps 60a, 64a, 65a, 66a and 67a.

In step 60a, it is determined whether or not the depression K of the throttle valve 25 is smaller than $K_3$. If $K \leq K_3$ the routine goes to step, 60, and the degree of opening $\theta_b$ of the bypass air control valve 20 is maintained with in the range of from ($\theta_{b0} - \Delta\theta$) to ($\theta_{b0} + \Delta\theta$). Conversely, if $K > K_3$, the routine goes to step 64a, and it is determined from the output signal of the absolute pressure sensor 46 whether or not the charging pressure $P_c$ in the intake duct 10 downstream of the mechanically driven supercharger 12 is higher than the pressure ($P_{c0} + \Delta P$) which is obtained by adding a small value $\Delta P$ to the desired charging pressure $P_{c0}$ illustrated in FIG. 8. If $P_c \geq P_{c0} + \Delta P$, the routine goes to step 65a, and the control signal for increasing the degree of opening $\theta_b$ of the bypass air control valve 20 by $\Delta\theta_b$ is supplied to the actuator 23. Conversely, if $P_c < P_{c0} + \Delta P$, the routine goes to step 66a, and it is determined whether or not the charging pressure $P_c$ is lower than $(P_{c0}-\Delta P)$. If $P_c \leq P_{c0}-\Delta P$, the routine goes to step 67a, and the control signal for decreasing the degree of opening $\theta_b$ of the bypass air control valve 20 by $\Delta\theta_b$ is supplied to the actuator 23. As a result, the charging pressure $P_c$ is maintained within the range of from $P_{c0}-\Delta P$ to $P_{c0}+\Delta P$.

Figure 12:
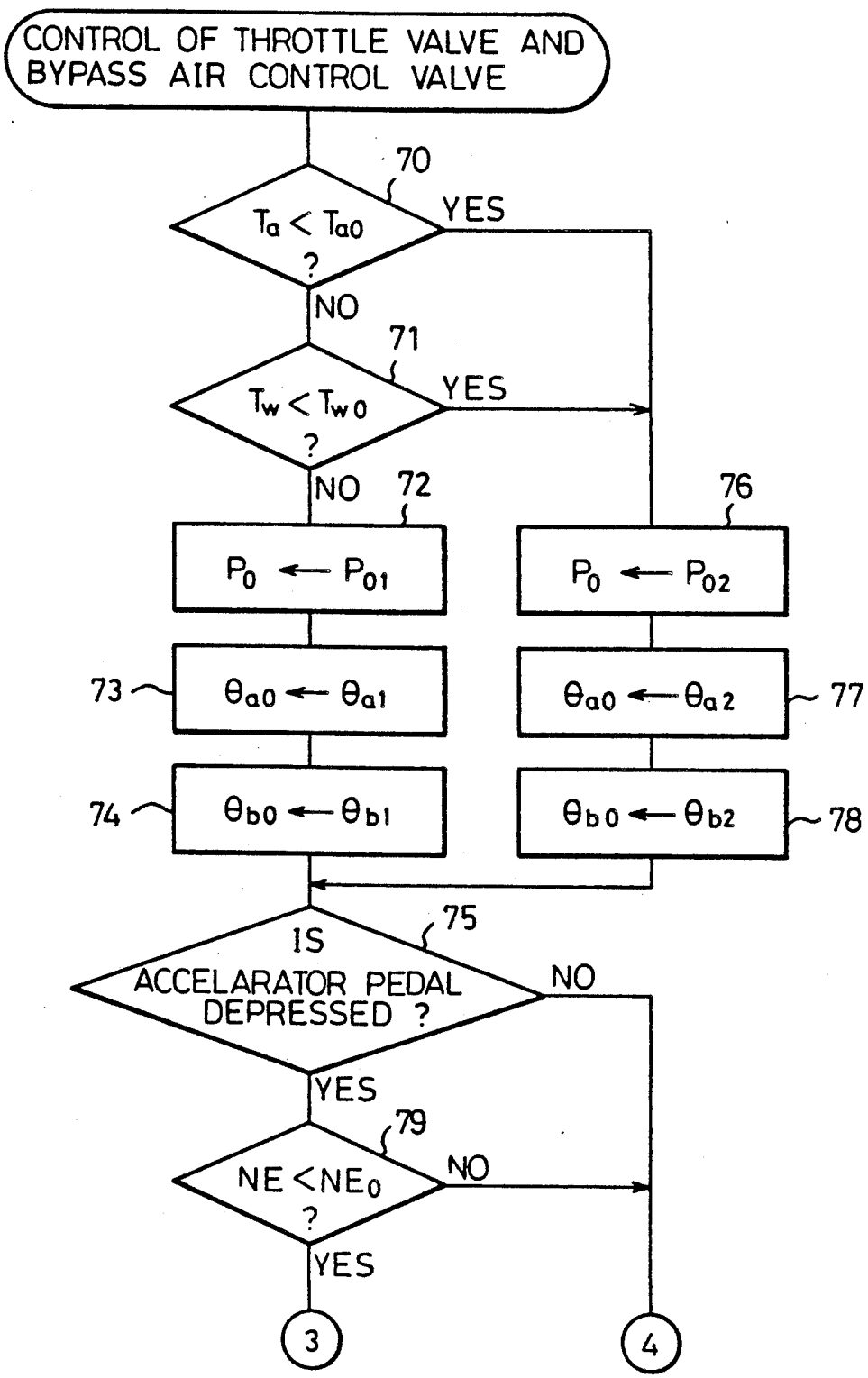
FIGS. 12 and 13 are a flow chart for executing the control illustrated in FIG. 11; and, FIG. 14 is a diagram illustrating the relationship between the engine speed and the output torque of the engine.
Figure 13:
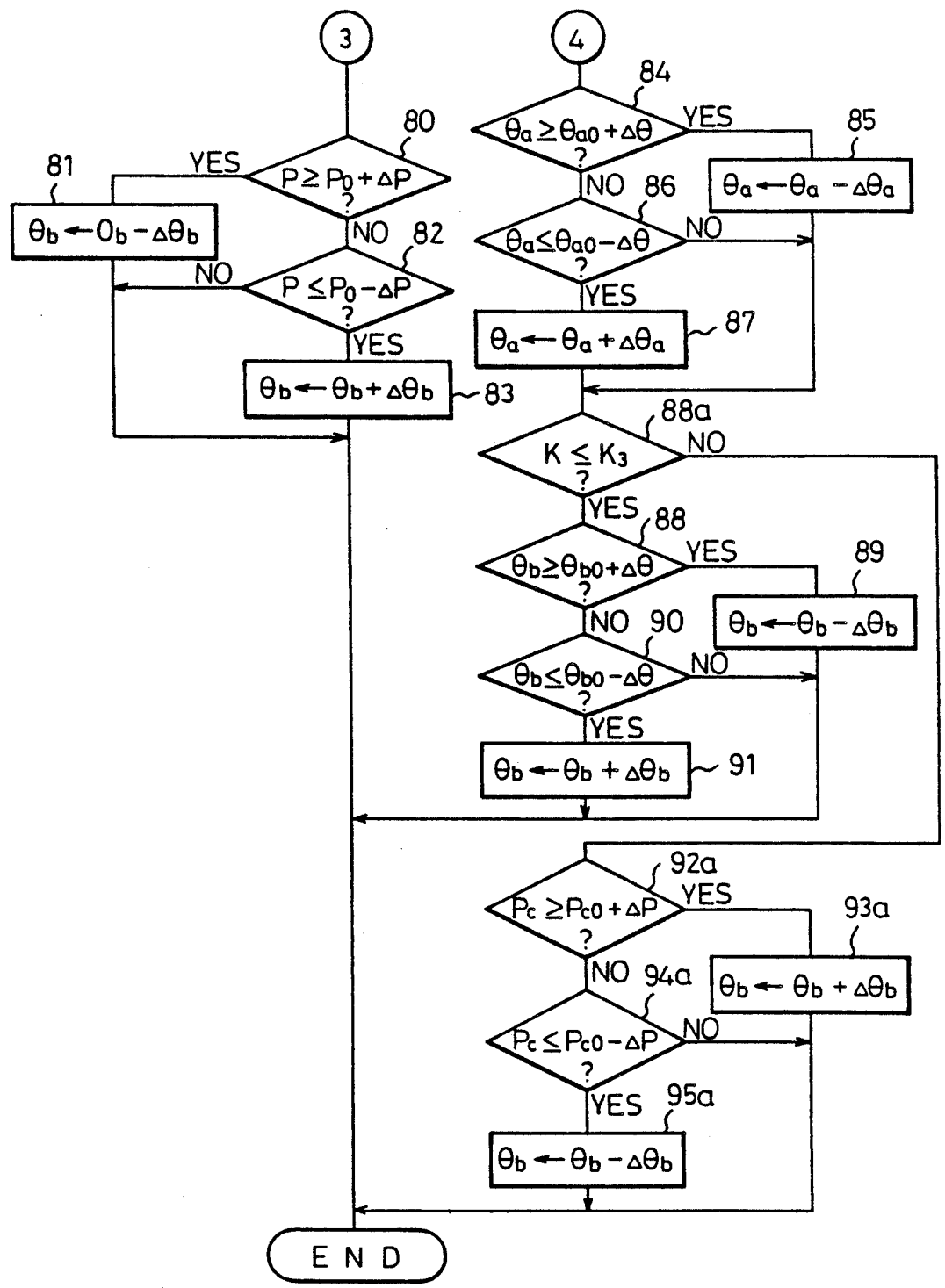

FIGS. 11 through 13 illustrate a still further embodiment which is a slight modification of the embodiment illustrated in FIGS. 4 through 6. In this embodiment, as can be seen from FIG. 11, in the same manner as described with reference to FIGS. 4 through 6, when the engine temperature or the outside air temperature is relatively high during idling, the degree of opening of the bypass air control valve 20 is controlled so that the absolute pressure P in the intake duct 13 downstream of the throttle valve 16 is a predetermined fixed level $P_{01}$ (corresponds to, for example, $-100$ mmHg).

While the depression of the accelerator pedal 25 is increased to $K_3$, the throttle valve 16, is opened from the fully closed position to the fully open position along the desired degree of opening $\theta_{a1}$. At this time, the bypass air control valve 20 is also opened along the desired degree of opening $\theta_{b1}$ at an opening rate lower than that of the throttle valve 16.

When the depression of the throttle valve 25 exceeds $K_3$, the throttle valve 16 is maintained at a fully open state. At this time, the degree of opening of the bypass air control valve 20 is controlled so that the charging pressure $P_c$ in the intake duct 10 downstream of the mechanically driven supercharger $P_c$ becomes equal to a desired charging pressure $P_{c0}$. The relationship between the depression of the accelerator pedal 25 and the desired degree of opening $\theta_{a1}$, $\theta_{b1}$ illustrated by the solid lines in FIG. 11, and the relationship between the depression of the accelerator pedal 25 and the desired charging pressure $P_{c0}$ illustrated by a solid line in FIG. 11, are stored in the ROM 32. In FIG. 11, the broken lines indicate changes in the degree of opening and the charging pressure.

Conversely, when the engine temperature or the outside air temperature is relatively low during idling, the degree of opening of the bypass air control valve 20 is controlled so that the absolute pressure P in the intake duct 13 downstream of the throttle valve 16 becomes equal to a predetermined fixed pressure $P_{02}$ (corresponds to, for example, $-200$ mmHg). At this time, the throttle valve 16 is maintained at a small degree of opening.

While the accelerator pedal 25 is depressed from the non-depressed state to the maximum depressed state, the throttle valve 16 is opened from the slightly open state to the fully open state along the desired degree of opening $\theta_{a2}$.

Conversely, the bypass air control valve 20 is gradually opened along the degree of opening $\theta_{b2}$ until the depression of the accelerator pedal 25 reaches $K_3$, and after the depression of the accelerator pedal 25 exceeds $K_3$, the degree of opening of the bypass air control valve 20 is controlled so that the charging pressure $P_c$ in the intake duct 10 downstream of the mechanically driven supercharger $P_c$ becomes equal to the desired charging pressure $P_{c0}$. The relationship between the depression of the accelerator pedal 25 and the desired degrees of opening $\theta_{a2}$, $\theta_{b2}$ illustrated by the solid lines in FIG. 11, and the relationship between the depression of the accelerator pedal 25 and the desired charging pressure $P_{c0}$ illustrated by a solid line in FIG. 11, are stored in the ROM 32.

Also in this embodiment, when the depression of the accelerator pedal 25 exceeds $K_3$, the amount of air fed into the engine cylinders is controlled by the output signal of the absolute pressure sensor 46 (FIG. 7).

FIGS. 12 and 13 illustrate a routine for executing the control of the degree of opening of the throttle valve 16 and the bypass air control valve 20, which control is illustrated in FIG. 11. This routine is processed by sequential interruptions executed at predetermined intervals.

The routine illustrated in FIGS. 12 and 13 is different from the routine illustrated in FIGS. 5 and 6 in that, in FIGS. 12 and 13, step 88a is inserted before step 88, and steps 92a, 93a, 94a and 95a are added. The remaining part of the routine illustrated in FIGS. 12 and 13 is the same as the routine illustrated in FIGS. 5 and 6, and therefore, the routine illustrated by FIGS. 12 and 13 will be hereinafter described while focusing on steps 88a, 92a, 93a, 94a and 95a.

In step 88a, it is determined whether or not the depression K of the throttle valve 25 is smaller than $K_3$. If $K \leq K_3$, the routine goes to step 88, and the degree of opening $\theta_b$ of the bypass air control valve 20 is maintained within the range of from $(\theta_{b0}-\Delta\theta)$ to $(\theta_{b0}+\Delta\theta)$. Conversely, if $K > K_3$, the routine goes to step 92a, and it is determined from the output signal of the absolute pressure sensor 46 whether or not the charging pressure $P_c$ in the intake duct 10 downstream of the mechanically driven supercharger 12 is higher than the pressure $(O_{c0}+\Delta P)$ obtained by adding a small value $\Delta P$ to the desired charging pressure $O_{c0}$ illustrated in FIG. 11. If $P_c \geq O_{c0}+\Delta P$, the routine goes to step 93a, and the control signal for increasing the degree of opening $\theta b$ of the bypass air control valve 20 by $\Delta\theta b$ is supplied to the actuator 23. Conversely, if $P_c < P_{c0}+\Delta P$, the routine goes to step 94a, and it is determined whether or not the charging pressure $P_c$ is lower than $(O_{c0}-\Delta P)$. If $P_c \geq O_{c0}-\Delta P$, the routine goes to step 95a, and the control signal for decreasing the degree of opening $\theta b$ of the bypass air control valve 20 by $\Delta\theta b$ is supplied to the actuator 23. As a result, the charging pressure $P_c$ is maintained within the range of from $(O_{c0}-\Delta P)$ to $(O_{c0}+\Delta P)$.

In the routine illustrated in FIGS. 5 and 6, when $T_a < T_{a0}$ or when $T_w < T_{w0}$, the routine goes to step 76 and in the embodiment illustrated in FIGS. 12 and 13, also, when $T_a < T_{a0}$ or when $T_w < T_{w0}$, the routine goes to step 76. Those routines may be modified so that, when $T_a < T_{a0}$ and when $T_w < T_{w0}$, the routine goes to step 76.

According to the present invention, when the engine is since the level of vacuum in the intake duct between the throttle valve and the mechanically driven supercharger is maintained at a predetermined level, it is possible to reduce the fuel consumption and obtain a stable idling of the engine while preventing knocking or self-ignition.

While the invention has been described by reference to specific embodiments chosen for purposes of illustration, it should be apparent that numerous modifications could be made thereto by those skilled in the art without departing from the basic concept and scope of the invention.

We claim:

1. An intake device of a two stroke engine; comprising:

an intake passage having a throttle valve therein;

a mechanically driven supercharger driven by the engine and arranged in said intake passage downstream of said throttle valve;

a bypass air passage branched from said intake passage between said throttle valve and said supercharger and connected to said intake passage downstream of said supercharger;

a bypass air control valve arranged in said bypass air passage;

detecting means for detecting a level of vacuum in said intake passage between said throttle valve and said supercharger and producing an output signal representing said level of vacuum; and bypass control means for controlling a degree of opening of said bypass air control valve in response to the output signal of said detecting means to bring said level of vacuum to a predetermined level when the engine is idling.

2. An intake device according to claim 1, wherein said predetermined level is about −100 mmHg.

3. An intake device according to claim 1, further comprising throttle control means for controlling a degree of opening of said throttle valve in response to a depression of an accelerator pedal.

4. An intake device according to claim 3, wherein said throttle control means controls said throttle valve in response to the depression of said accelerator pedal to equalize the degree of opening of said throttle valve with a predetermined first degree of opening, and said bypass control means controls said bypass air control valve in response to the depression of said accelerator pedal to equalize the degree of opening of said bypass air control valve to a predetermined second degree of opening when said accelerator pedal is depressed.

5. An intake device according to claim 4, wherein said predetermined first degree of opening is increased from a minimum degree of opening to a first desired throttle degree of opening as the depression of said accelerator pedal is increased from zero to a predetermined first depression, and said predetermined second degree of opening is increased from a basic degree of opening to a first desired bypass degree of opening as the depression of said accelerator pedal is increased from zero to said predetermined first depression.

6. An intake device according to claim 5, wherein said minimum degree of opening of said throttle valve is zero.

7. An intake device according to claim 5, wherein said basic degree of opening of said bypass air control valve is approximately equal to the degree of opening of said bypass air control valve maintained when the engine is idling.

8. An intake device according to claim 5, wherein said predetermined second degree of opening is increased at a rate which is lower than an increasing rate of said predetermined first degree of opening.

9. An intake device according to claim 5, wherein said predetermined first degree of opening is maintained at said first desired throttle degree of opening while the depression of said accelerator pedal is increased from said predetermined first depression to a predetermined second depression, and said predetermined second degree of opening is gradually decreased while the depression of said accelerator pedal is increased from said predetermined first depression to said predetermined second depression.

10. An intake device according to claim 9, wherein said predetermined first degree of opening is increased from said first desired throttle degree of opening to a maximum degree of opening as the depression of said accelerator pedal is increased after exceeding said predetermined second depression, and said predetermined second degree of opening is decreased to zero after the depression of said accelerator pedal exceeds said predetermined second depression.

11. An intake device according to claim 5, further comprising a pressure sensor for detecting a charging pressure in said intake passage downstream of said super charger and for producing an output signal representing said charging pressure, wherein said first desired throttle degree of opening is a maximum degree of opening, and said predetermined first degree of opening is maintained at said maximum degree of opening when the depression of said accelerator pedal exceeds said predetermined first depression, said bypass control means controlling said bypass air control valve in response to the output signal of said pressure sensor to equalize said charging pressure with a predetermined charging pressure when the depression of said accelerator pedal exceeds said predetermined first depression.

12. An intake device according to claim 11, wherein said predetermined charging pressure is increased as the depression of said accelerator pedal is increased.

13. An intake device according to claim 4, wherein the relationship between said predetermined first degree of opening and the depression of said acceleration pedal and the relationship between said predetermined second degree of opening and the depression of said accelerator pedal are stored in a memory.

14. An intake device according to claim 4, wherein said throttle control means comprises an actuator for actuating said throttle valve, and a potentiometer for detecting the degree of opening of said throttle valve, and said bypass control valve comprises an actuator for actuating said bypass air control valve, and a potentiometer for detecting the degree of opening of said bypass air control valve.

15. An intake device according to claim 1, further comprising temperature detecting means for detecting a temperature which has an influence on the combustion of the engine and producing an output signal representing said temperature, wherein said predetermined level is changed in accordance with a change in said temperature.

16. An intake device according to claim 15, wherein said temperature is the engine temperature.

17. An intake device according to claim 15, wherein said temperature is the outside air temperature.

18. An intake device according to claim 15, wherein said predetermined level is a first level at which said temperature is higher than a predetermined temperature, and said predetermined level is a second level which is greater than said first level when said temperature is lower than said predetermined level.

19. An intake device according to claim 18, wherein said first level is about −100 mmHg, and said second level is about −200 mmHg.

20. An intake device according to claim 18, further comprising throttle control means for controlling a degree of opening of said throttle valve in response to a depression of an accelerator pedal.

21. An intake device according to claim 20, wherein said throttle control means controls said throttle valve in response to the depression of said accelerator pedal and the output signal of said temperature detecting means to bring the degree of opening of said throttle valve to a predetermined first degree of opening when said temperature is higher than said predetermined temperature and to bring the degree of opening of said throttle valve to a predetermined third degree of opening when said temperature is lower than said predetermined temperature, and said bypass control means controls said bypass air control valve in response to the depression of said accelerator pedal and the output signal of said temperature detecting means to bring the degree of opening of said bypass air control valve to a predetermined second degree of opening when said accelerator pedal is depressed and when said temperature is higher than said predetermined temperature and to bring the degree of opening of said bypass air control valve to a predetermined fourth degree of opening when said accelerator pedal is depressed and when said temperature is lower than said predetermined temperature.

22. An intake device according to claim 21, wherein said predetermined first degree of opening is increased from a minimum degree of opening to a first desired throttle degree of opening as the depression of said accelerator pedal is increased from zero to a predetermined first depression, and said predetermined second degree of opening is increased from a basic degree of opening to a first desired bypass degree of opening as the depression of said accelerator pedal is increased from zero to said predetermined first depression.

23. An intake device according to claim 22, wherein said minimum degree of opening of said throttle valve is zero.

24. An intake device according to claim 22, wherein said basic degree of opening of said bypass air control valve is approximately equal to the degree of opening of said bypass air control valve maintained when the engine is idling and when said temperature is higher than said predetermined temperature.

25. An intake device according to claim 22, wherein said predetermined second degree of opening is increased at a rate which is lower than an increasing rate of said predetermined first degree of opening.

26. An intake device according to claim 22, wherein said predetermined first degree of opening is maintained at said first desired throttle degree of opening while the depression of said accelerator pedal is increased from said predetermined first depression to a predetermined second depression, and said predetermined second degree of opening is gradually decreased while the depression of said accelerator pedal is increased from said predetermined first depression to said predetermined second depression.

27. An intake device according to claim 26, wherein said predetermined first degree of opening is increased from said first desired throttle degree of opening to a maximum degree of opening as the depression of said accelerator pedal is increased after exceeding said predetermined second depression, and said predetermined second degree of opening decreased to zero after the depression of said accelerator pedal exceeds said predetermined second depression.

28. An intake device according to claim 22, further comprising a pressure sensor for detecting a charging pressure in said intake passage downstream of said supercharger and for producing an output signal representing said charging pressure, wherein said first desired throttle degree of opening is a maximum degree of opening, and said predetermined first degree of opening is maintained at said maximum opening degree when the depression of said accelerator pedal exceeds said predetermined first depression, said bypass control means controlling said bypass air control valve in response to the output signal of said pressure sensor to equalize said charging pressure with a predetermined charging pressure when the depression of said accelerator pedal exceeds said predetermined first depression.

29. An intake device according to claim 28, wherein said predetermined charging pressure is increased as the depression of said accelerator pedal is increased.

30. An intake device according to claim 21, wherein said predetermined third degree of opening is increased from a minimum degree of opening to a desired throttle degree of opening as the depression of said accelerator pedal is increased from zero to a predetermined depression, and said predetermined fourth degree of opening is decreased from a basic degree of opening as the depression of said accelerator pedal is increased from zero to said predetermined depression.

31. An intake device according to claim 30, wherein said minimum degree of opening of said throttle valve is a predetermined small degree.

32. An intake device according to claim 30, wherein said basic degree of opening of said bypass air control valve is approximately equal to the degree of opening of said bypass air control valve, maintained when the engine is idling and when said temperature is lower than said predetermined temperature.

33. An intake device according to claim 30, wherein said predetermined third degree of opening is increased from said desired throttle degree of opening to a maximum degree of opening as the depression of said accelerator pedal is increased after exceeding said predetermined depression, and said predetermined fourth degree of opening is decreased to zero after the depression of said accelerator pedal exceeds said predetermined depression.

34. An intake device according to claim 30, further comprising a pressure sensor for detecting a charging pressure in said intake passage downstream of said supercharger and for producing an output signal representing said charging pressure, wherein said desired throttle degree of opening is a maximum degree of opening, and said predetermined third degree of opening is maintained at said maximum degree of opening when the depression of said accelerator pedal exceeds said predetermined depression, said bypass control means controlling said bypass air control valve in response to the output signal of said pressure sensor to equalize said charging pressure with a predetermined charging pressure when the depression of said accelerator pedal exceed said predetermined depression.

35. An intake device according to claim 34, wherein said predetermined charging pressure is increased as the depression of said accelerator pedal is increased.

36. An intake device according to claim 21, wherein the relationship between said predetermined first degree of opening degree opening and the depression of said acceleration pedal, the relationship between said predetermined second degree of opening and the depression of said accelerator pedal, the relationship between said predetermined third degree of opening and the depression of said acceleration pedal and the relationship between said predetermined fourth degree of opening and the depression of said accelerator pedal are stored in a memory.

37. An intake device according to claim 21, wherein said throttle control means comprises an actuator for actuating said throttle valve, and a potentiometer for detecting the degree of opening of said throttle valve, and said bypass control valve comprises an actuator for actuating said bypass air control valve, and a potentiometer for detecting the degree of opening of said bypass air control valve.

* * * * *